(12) United States Patent
Naoki

(10) Patent No.: US 7,069,564 B2
(45) Date of Patent: Jun. 27, 2006

(54) DISK APPARATUS

(75) Inventor: Gorou Naoki, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/284,545

(22) Filed: Nov. 22, 2005

(65) Prior Publication Data

US 2006/0075415 A1 Apr. 6, 2006

Related U.S. Application Data

(62) Division of application No. 10/394,399, filed on Mar. 20, 2003, now Pat. No. 7,003,784.

(30) Foreign Application Priority Data

Nov. 20, 2001 (JP) .............................. 2001-355216

(51) Int. Cl.
*G11B 17/03* (2006.01)
(52) U.S. Cl. ..................................... 720/601
(58) Field of Classification Search ................ 720/601, 720/603, 609, 610, 619, 622, 730
See application file for complete search history.

(56) References Cited

U.S. PATENT DOCUMENTS

| 5,355,358 | A | 10/1994 | Van Alfen |
| 5,784,350 | A | 7/1998 | Akiba et al. |
| 5,799,009 | A * | 8/1998 | Takahashi et al. .......... 720/730 |
| 5,812,511 | A | 9/1998 | Kawamura et al. |
| 5,878,013 | A | 3/1999 | Maeda et al. |
| 5,930,218 | A | 7/1999 | Mitsui et al. |
| 5,978,341 | A | 11/1999 | Jeong |
| 6,134,205 | A | 10/2000 | Watanabe |
| 2004/0027962 | A1 | 2/2004 | Kabasawa |

\* cited by examiner

*Primary Examiner*—Allen Cao
(74) *Attorney, Agent, or Firm*—Hamre, Schumann, Mueller & Larson, P.C.

(57) ABSTRACT

Provided are a tray 2 for mounting a cartridge 101 that houses a disk and has an aperture for exposing an information layer and a shutter 101*a* for opening/closing the aperture, a conveyor for conveying the tray 2, an opener 13 having an engaging member and opening/closing the shutter 101*a*, and guiding members 14, 15, 16 arranged to engage with the opener 13 and interlocked with a conveyance operation of the tray 2 so that engagement position with an engaging member of the opener 13 changes, wherein the guiding members 14, 15, 16 are arranged opposing the face for mounting the cartridge 101. Thereby, there is no need for providing to the upper part of the cartridge 101 a system for opening/closing the shutter 101*a*, and thus a space below the tray 2 can be used effectively, resulting in downsizing of the apparatus.

1 Claim, 31 Drawing Sheets

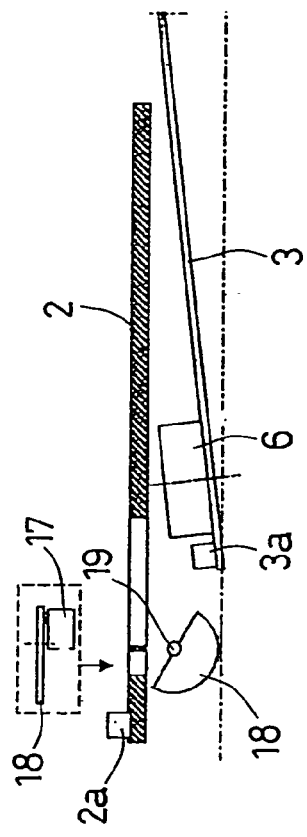
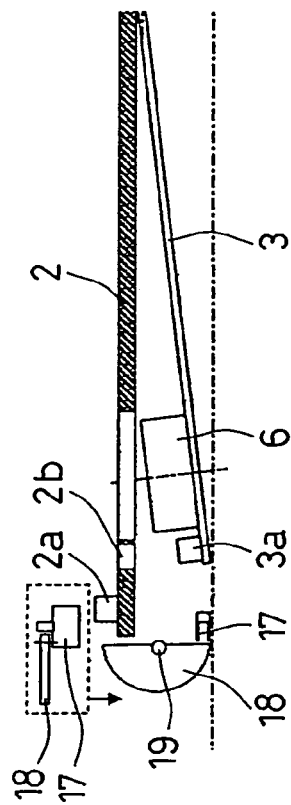
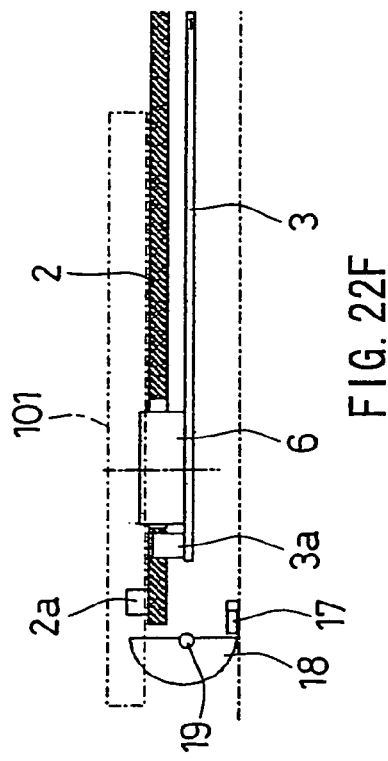
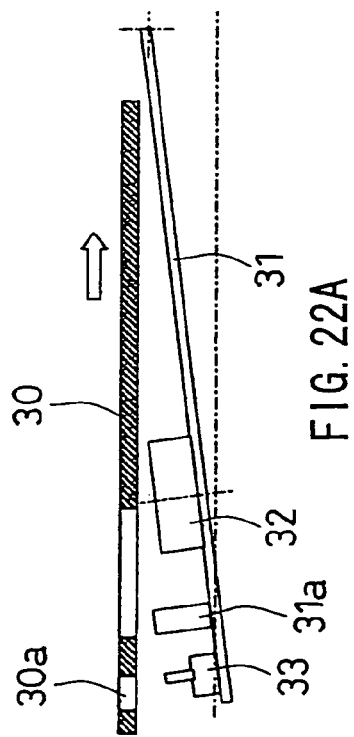
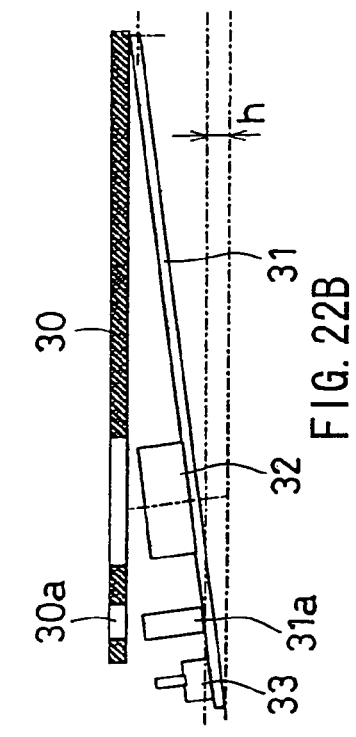
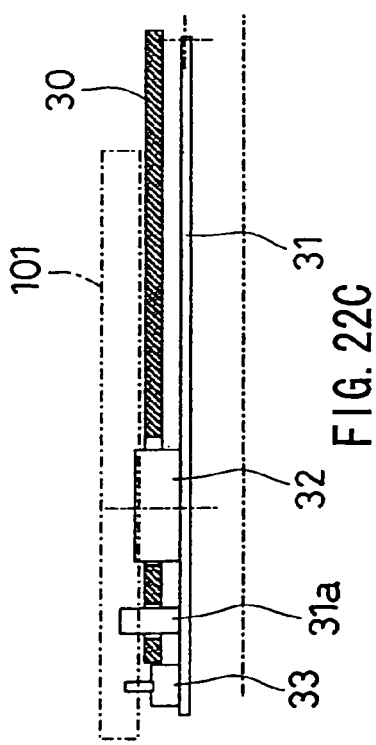

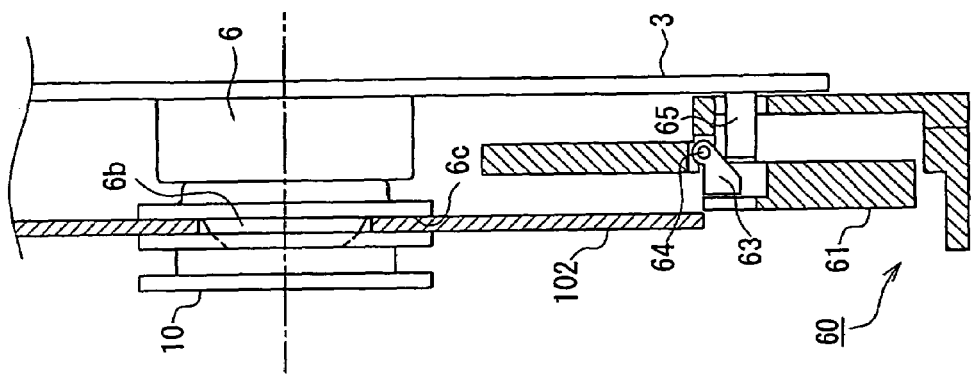
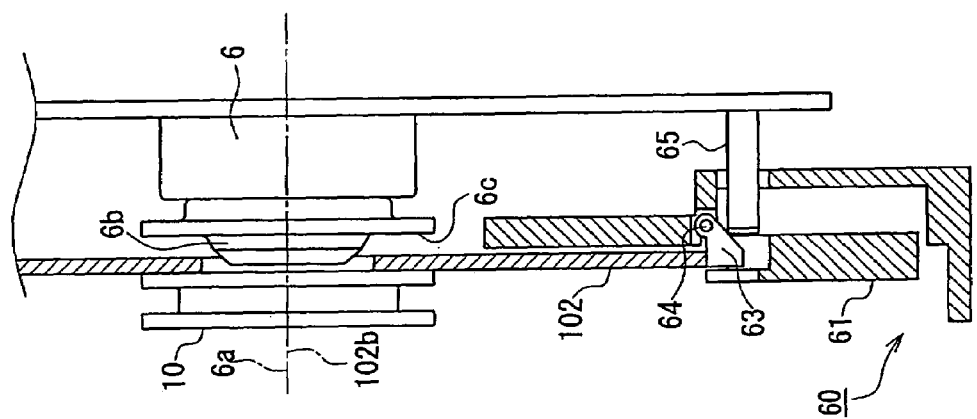
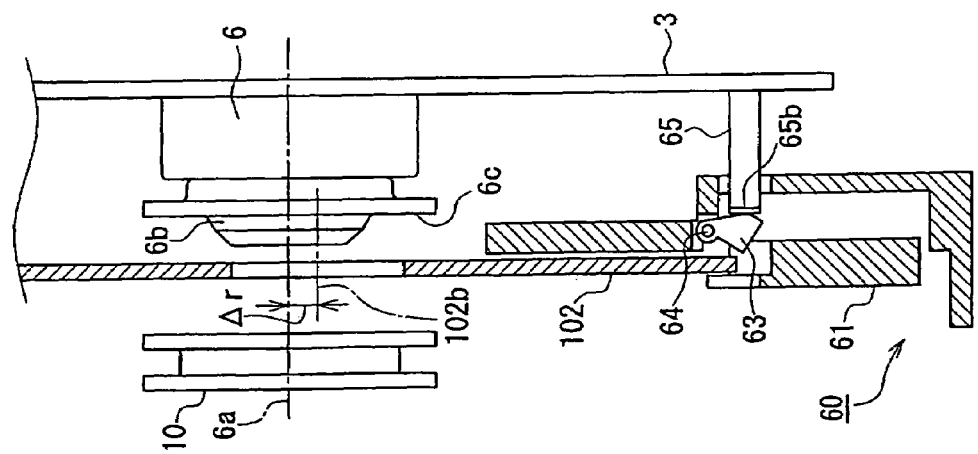

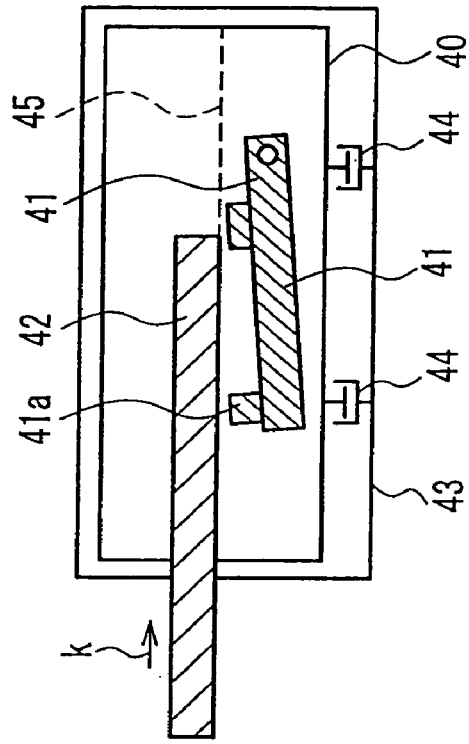
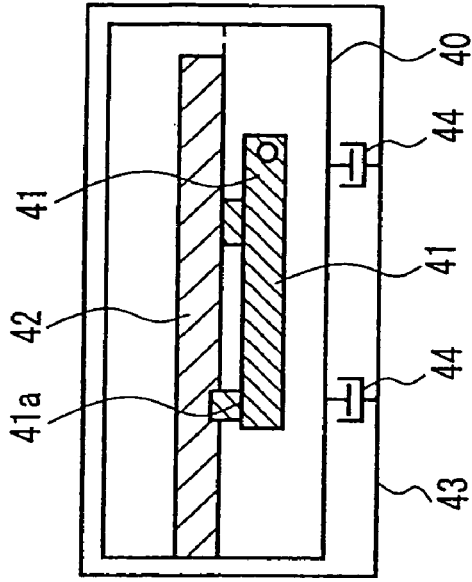
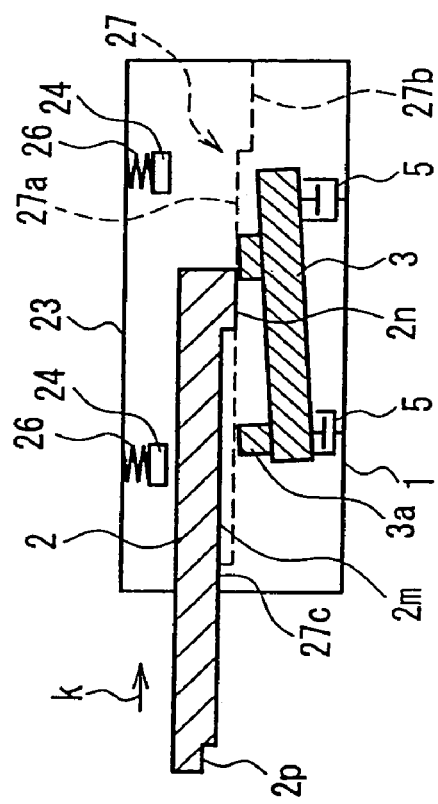
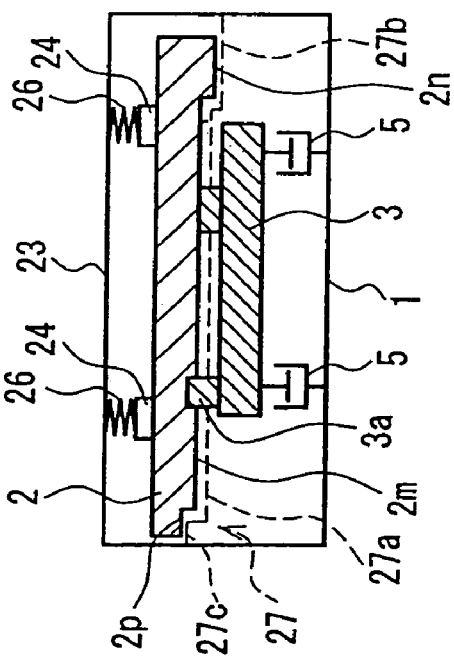
FIG. 31A  FIG. 31C
FIG. 31B  FIG. 31D

DISK APPARATUS

This application is a Division of application Ser. No. 10/394,399, filed Mar. 20, 2003 now U.S. Pat. No. 7,003,784, which application is incorporated herein by reference.

FIELD OF THE INVENTION

The present invention relates to a disk apparatus for performing recording and reproduction of information by using a disk as an information recording medium for pictures, music, and computer data. Specifically, the present invention relates to a system for loading a disk.

BACKGROUND OF THE INVENTION

Recently, large-capacity optical disks such as DVD-ROM have been used widely as storage means for massive amount of information of computers or the like. Similarly, attention has been focused on DVD-RAM that enables free rewriting of recorded information and recording massive amount of information. As a consequence, the development of disk apparatuses for DVD-RAM has proceeded. Generally, a rewritable optical disk such as DVD-RAM is handled in a state of being housed in a cartridge for securing the reliability.

In this situation, recently-developed disk apparatuses can accept both bare disks with exposed recording-reproducing face and a cartridge housing a disk and also can perform recording and reproduction thereof.

However, an apparatus capable of accepting a cartridge has a system for loading a cartridge larger than a bare disk in the outer diameter, and the loading system would be upsized in comparison with a system for loading a bare disk exclusively, thereby causing increased cost.

For avoiding the above-described problems, an object of the present invention is to miniaturize a loading system so as to downsize a disk apparatus.

SUMMARY OF THE INVENTION

For achieving the above-mentioned object, a first disk apparatus according to the present invention has a tray for mounting a cartridge that houses a disk having an information layer and has an aperture for exposing the information layer and a shutter for opening/closing the aperture, a conveyor for conveying the tray, and an opener interlocked with the conveyance operation of the tray so as to open/close the shutter;

the opener includes an opener engaging portion for engaging with a guiding member that guides the opening/closing operations of the shutter; and the guiding member is arranged opposing the face on which the cartridge is mounted.

Next, a second disk apparatus according to the present invention has a tray for mounting a cartridge that houses a disk having an information layer and has an aperture for exposing the information layer and a shutter for opening/closing the aperture, an opener for opening/closing the shutter, and an opener holder for holding the shutter that has been opened by the opener;

the opener and the opener holder are attached to the tray, and a force to hold the opened shutter is applied exclusively by the tray, the opener and the opener holder.

Next, a third disk apparatus according to the present invention has a tray for mounting a cartridge that houses a disk having an information layer and has an aperture for exposing the information layer and a shutter for opening/closing the aperture, and a conveyor for conveying the tray, an opener that engages with the shutter and opens/closes the shutter in a substantially cross direction with respect to the conveyance direction of the conveyor, a plurality of guiding members arranged independently, and an engaging member formed in the opener so as to engage with the guiding members;

the plural guiding members are arranged so that, with the conveyance of the tray, at least one of the engaging members moves following the guiding members while the opener moves in a substantially cross direction with respect to the conveyance direction; and as the conveyance proceeds, at least one of the engaging members engaging with the guiding members is disengaged and engages with a separate guiding member, and moves following the separate guiding member, while the opener continues to move in a substantially cross direction with respect to the conveyance direction.

Next, a fourth disk apparatus according to the present invention has a tray for mounting a disk having an information layer, a clamper for interposing and holding the disk between itself and a motor, a clamper holder for engaging with and holding the clamper, a top plate that is arranged separately from the tray and has a sliding portion on which the clamper holder slides, and a conveyor for conveying the tray;

the clamper is attached to a hole-formed part of the top plate, and the clamper holder has a part at which the thickness changes;

engagement of the clamper holder and the clamper is provided at the part with changed thickness of the clamper holder, and the clamper holder is interlocked with the conveyance operation of the tray and displaces the vertical position of the clamper while moving on the sliding portion.

Next, a fifth disk apparatus according to the present invention has a tray for mounting a hole-formed cartridge that houses a disk having an information layer, a motor for rotating the disk and a base having a first projection and the motor mounted thereon;

the tray has a second projection for engaging in the hole of the cartridge and a hole for engaging with the first projection of the base;

at a loading position for loading the disk on the motor, the first projection of the base engages in the hole of the tray so that the tray is positioned on the base; and when mounting the cartridge on the tray, the second projection of the tray engages in the hole of the cartridge so that the cartridge is positioned on the tray. According to the disk apparatus, the thickness of the loading system can be decreased so as to downsize the apparatus.

Next, a sixth disk apparatus according to the present invention has a tray for mounting a disk having an information layer; a conveyor for conveying the tray; a base on which a motor for rotating the disk is mounted; and a part-to-be-engaged which the tray in conveyance slides on and engages; a box for containing the tray, the conveyor and the base; and a pressing member for pressing the tray onto the base; the base is attached to the box via a damper; and at a position for loading the disk on the motor, a tray is pressed by the pressing member onto the base and separated from the part-to-be-engaged.

Next, a seventh disk apparatus according to the present invention has a tray for mounting a disk having an information layer, and a position controller for controlling the position of the disk;

the position controller has a wall face for controlling the position of the disk in the main face direction, a rotation axis arranged at a position indented from the main face of the tray and extending in a substantially radial direction of the disk mounted on the tray, a plurality of elements connected via the rotation axis, and a biasing member for applying a force in a direction for floating the disk from the tray main face;

furthermore, the position controller has an extending portion, the extending portion extends toward the center of the disk mounted on the tray main face with respect to the wall face, and the extending portion overlaps a part of the main face in a state in which the disk is in contact with the wall face.

Next, an eighth disk apparatus according to the present invention has a tray for mounting several kinds of disks having information layers and being different from each other in the outer diameter, and a position controller for controlling the positions of the disks;

the position controller has a first wall face for controlling the position of the first disk in the main face direction, a rotation axis that is arranged at a position indented from the main face of the tray and extends in the substantially radial direction of the first disk mounted on the tray, a plurality of elements connected via the rotation axis, and a biasing member for applying a force in a direction to float the first disk from the tray main face;

the tray has a second wall face for controlling the position in the main face direction of a second disk that is smaller than the first disk in the outer diameter; and the position controller extends toward the center of the second disk mounted on the tray main face with respect to the second wall face, and a part of the position controller and a part of the main face of the second disk overlap each other in a state in which the second disk is in contact with the second wall face.

BRIEF DESCRIPTION OF THE DRAWINGS

FIG. 22 is a view for explaining a comparison between a positioning operation of a loading device according to one embodiment of the present invention and a positioning operation of a loading device according to a conventional example.

FIG. 26A is a cross-sectional view showing that a tray is housed in a mechanical base, according to one embodiment of the present invention.

FIG. 26B is a cross-sectional view showing that position correction of a bare disk has been completed, according to one embodiment of the present invention.

FIG. 26C is a cross-sectional view showing that a bare disk is in a loading state, according to one embodiment of the present invention.

FIGS. 31A–31D is a view for explaining comparison between shock absorption of a loading device according to one embodiment of the present invention and shock absorption of a loading device according to a comparative example.

DETAILED DESCRIPTION OF THE INVENTION

Figure 1:
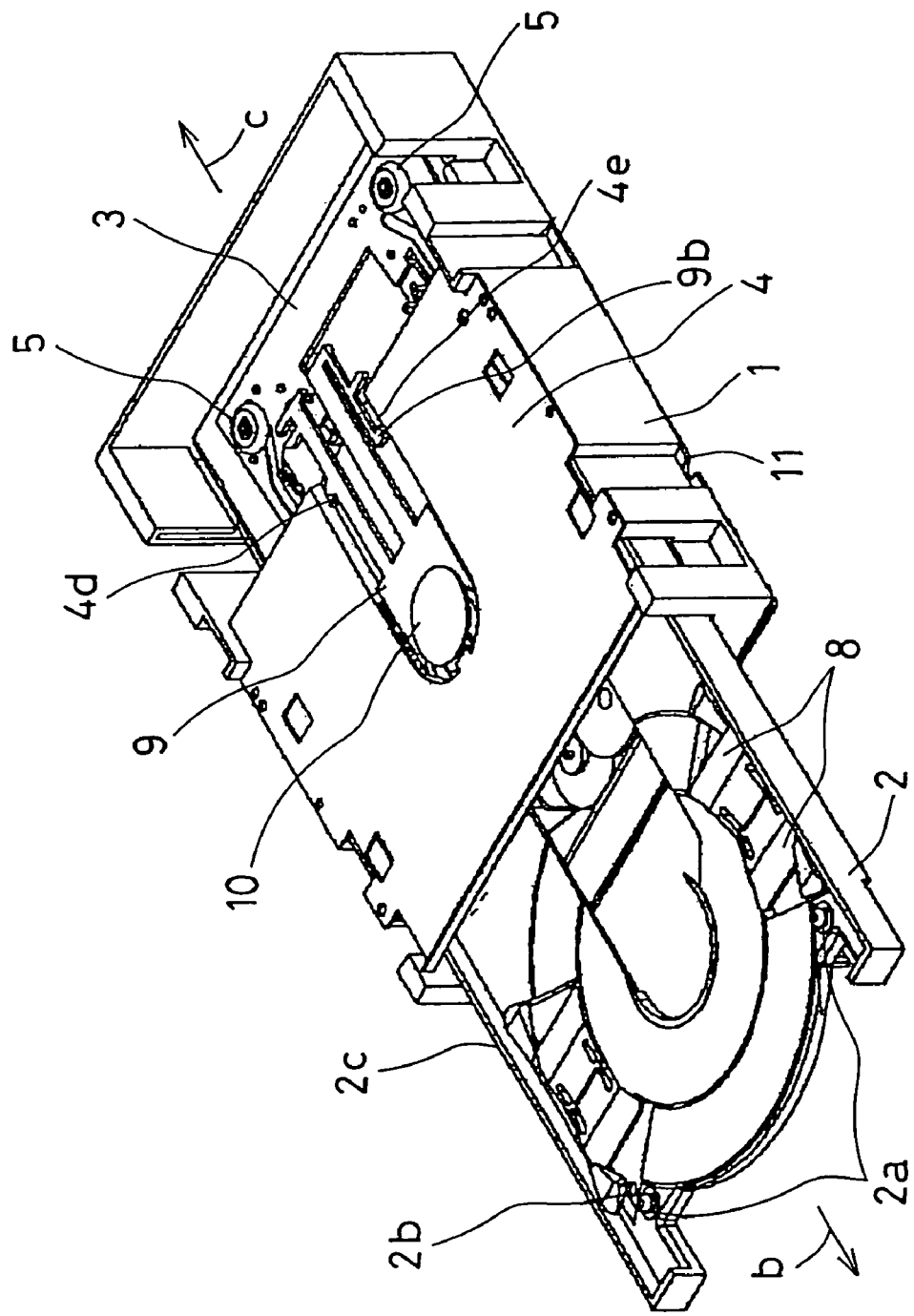
FIG. 1 is a perspective view of a loading device according to one embodiment of the present invention.

According to the first disk apparatus of the present invention, there is no need for providing a system for opening/closing a shutter on the upper part of the cartridge, and thus a space below the tray can be used effectively so as to downsize the apparatus.

It is preferable that the first disk apparatus further has an opener holder for holding the shutter that has been opened by the opener, the opener and the opener holder are attached to the tray, the opener holder holds the shutter in an open state when the tray is conveyed to a predetermined position, and the guiding member is arranged so that the opener holder is disengaged from the guiding member after the opener holder holds the shutter. According to this disk apparatus, it is possible to reduce the length of the guiding member and also suppress abrasion of the engaging member of the opener. In addition, application of a force from outside the tray can be prevented.

It is also preferable that an opener holder for holding the shutter that has been opened by the opener is provided as well, wherein the opener and the opener holder are attached to the tray, and the opener holder holds the shutter in an open state when the tray is conveyed to a predetermined position; the guiding members are arranged so that the opener engaging portion is disengaged from the guiding members after the opener holder holds the shutter; and a force to hold the open shutter is applied exclusively by the tray, the opener and the opener holder. According to this disk apparatus, it is possible to reduce the length of the guiding members and suppress the abrasion of the engaging member of the opener, and prevent application of a force from outside the tray. Furthermore, since no force to hinder the positioning of the tray will be applied, the tray can be positioned easily and accurately.

According to the second disk apparatus, no force to hinder positioning of the tray will be applied, and thus the tray can be positioned easily and accurately.

In the second disk apparatus, it is preferable that the opener has an engaging member, and further a guiding member is arranged so as to engage with the engaging member of the opener, and the guiding member is interlocked with the conveyance operation of the tray so that the position for engaging with the opener will change; the opener holder holds the shutter in an open state when the tray is conveyed to a predetermined position; and the guiding member is arranged so that the engaging member of the opener will be disengaged from the guiding member after the opener holder holds the shutter. According to this disk apparatus, it is possible to reduce the length of the guiding members and suppress the abrasion of the engaging member of the opener, and thus application of a force from outside the tray can be prevented.

According to the third disk apparatus of the present invention, since opening/closing and movement of the opener is shared by a combination of a plurality of guiding members and engaging members, plural guiding members can be dispersed, and thus the space can be used effectively. Therefore, the guiding members can be provided opposite to the tray-mounting face, resulting in downsizing of the apparatus.

It is preferable that the third disk apparatus has also an opener holder for holding the shutter that has been opened by the opener, the opener and the opener holder are attached to the tray, and the opener holder holds the shutter in an open state when the tray is conveyed to a predetermined position, and the guiding member is arranged so that the engaging members of the opener are disengaged from the guiding members after the opener holder holds the shutter. According to this disk apparatus, it is possible to reduce the length of the guiding members and suppress the abrasion of the engaging member of the opener, and thus application of a force from outside the tray can be prevented.

According to the fourth disk apparatus of the present invention, switching of the vertical position of the clamper is available in a simple structure by using the tray conveyance operation.

It is preferable in the fourth disk apparatus that the top plate has a pressing lever for pressing the tray, and the clamper holder has an engaging portion for engaging with the pressing lever; the pressing of the pressing lever on the tray is switched on and off corresponding to the engaging and disengaging between the engaging portion and the pressing lever, and the switching of the engagement corresponds to the change in the position of the clamper holder caused by the movement of the sliding portion.

It is also preferable that the tray is capable of mounting the cartridge that houses a disk having an information layer, the pressing lever has further a cartridge pressing portion, and in a state of mounting the cartridge on the tray, the cartridge pressing member presses the cartridge in a state in which the pressing lever presses the tray.

It is also preferable that the tray is capable of mounting a cartridge that houses a disk having an information layer and has an aperture for exposing the information layer and a shutter for opening/closing the aperture; the sliding portion is displaced toward the tray with respect to the main face of the top plate so that the sliding portion is arranged within the aperture while the shutter is in an open state. According to the disk apparatus, the space in the aperture of the cartridge can be used efficiently, and thus the apparatus can be downsized.

According to the fifth disk apparatus of the present invention, the thickness of the loading system can be decreased, thereby downsizing the apparatus.

According to the sixth disk apparatus of the present invention, since external shock can be clamped within the box, a separate buffer space on the periphery of the box can be omitted, and thus the apparatus can be downsized.

It is preferable that the sixth disk apparatus has a first convex on the tray at the side for engaging with the part-to-be-engaged, and the convex is elevated with respect to the standard face of the tray, and a first recess indented with respect to the standard face of the tray; the part-to-be-engaged has a second convex elevated with respect to the standard face of the part-to-be-engaged and a second recess indented with respect to the standard face of the part-to-be-engaged; during the conveyance of the tray, the first convex of the tray and the standard face of the part-to-be-engaged will slide and engage with each other, and the standard face of the tray and the first convex of the part-to-be-engaged will slide and engage with each other; and at the loading position, the first convex of the tray and the second recess of the part-to-be-engaged correspond to each other, and the first recess of the tray and the second convex of the part-to-be-engaged correspond to each other, so that the tray is separated from the part-to-be-engaged.

Furthermore, it is preferable that the tray is capable of mounting a cartridge that houses a disk having an information layer and has an aperture for exposing the information layer and a shutter for opening/closing the aperture; it has also an opener that engages with the shutter and opens/closes the shutter in a substantially cross direction with respect to the conveyance direction of the conveyor, a guiding member arranged to engage with the engaging member of the opener and interlocked with the conveyance operation of the tray so that the position for engagement with the opener will change, and an opener holder for holding the shutter that has been opened by the opener; the opener and the opener holder are attached to the tray, and the opener holder holds the shutter in an open state when the tray is conveyed to a predetermined position; and the guiding members are arranged so that the engaging members of the opener are disengaged from the guiding members after the opener holder holds the shutter. According to this disk apparatus, it is possible to reduce the length of the guiding members and suppress the abrasion of the engaging member of the opener, and thus application of a force from outside the tray can be prevented.

Furthermore, it is preferable that the tray is capable of mounting a hole-formed cartridge housing a disk having an information layer; the tray has a second projection for engaging in the hole of the cartridge and a hole for engaging with the first projection of the base; and at a loading position for loading the disk on the motor, the first projection of the base engages in the hole of the tray so that the tray is positioned on the base; when the cartridge is mounted on the tray, the second projection of the tray engages in the hole of the cartridge so that the cartridge is positioned on the tray. According to the disk apparatus, the thickness of the loading system can be decreased so as to downsize the apparatus.

The seventh disk apparatus of the present invention can be downsized since the position controller does not protrude to the lower part of the tray. Moreover, since the position controller has an extending portion, the apparatus can correspond to vertical placement of disks.

In the seventh disk apparatus, it is preferable that, in a case of mounting the disk horizontally on the tray, the position controller is allowed to be set so that the position of the side face of the extending portion and the position of the peripheral face of the disk match substantially with each other in the vertical direction, the side face of the extending portion is positioned to control the position of the disk in the main face direction; and in a state in which the position controller is displaced in a direction for floating from the tray main face by a force applied by a biasing member, the wall face is positioned for controlling the position of the disk in the main face direction. According to this disk apparatus, it is possible, in a case of placing a disk horizontally, to prevent the disk from slipping below the extending portion and making it difficult to take the disk out.

Furthermore, it is preferable that a correction lever for correcting the position of the disk is provided further, the correction lever is interlocked with the conveyance operation of the tray and protrudes toward the main face of the tray, and it corrects the position of the disk in the plan direction of the tray main face while being in contact with the peripheral face of the disk; and in a case of mounting on the tray a cartridge housing a disk, the protrusion of the correction lever toward the tray main face will stop. According to this disk apparatus, centering of the disk to the motor can be carried out easily and accurately. Moreover, this configuration is useful in preventing the cartridge from being pushed out in a case of mounting the cartridge.

It is also preferable that, at a position to which the tray is located as a result of a conveyance of a certain distance, a projection to be contacted with the correction lever is provided, the correction lever is attached rotatably about the rotation axis, the correction lever is interlocked with the conveyance operation of the tray and rotates while sliding on the projection, the tip of the correction lever protrudes toward the tray main face; and in a case that the cartridge housing the disk is mounted on the tray, the correction lever retracts to a position not to be in contact with the projection.

According to the eighth disk apparatus of the present invention, a plurality of kinds of bare disks different from each other in diameter can be placed vertically for recording and reproducing.

It is preferable in the eighth disk apparatus that, in a case of mounting the second disk horizontally on the tray, the position controller is allowed to be set so that the position of an internal circumferential side face of the position controller matches with the peripheral face of the second disk in the vertical direction, and the internal circumferential side face is positioned for controlling the position of the second disk in the main face direction. According to the disk apparatus, it is possible, in a case of placing a disk horizontally, to prevent the disk from slipping below the extending portion and making it difficult to take the disk out.

Moreover, it is preferable that the apparatus has a lifting member for engaging the plural kinds of disks and a turn table provided to a motor for rotating the disks by a raising/lowering operation of a base on which the motor is mounted, and a correction lever for correcting the position of the second disk; and the correction lever is interlocked with at least one of the lifting operation and conveyance operation of the tray and corrects the position of the second disk in the plan direction of the tray main face while being in contact with the peripheral face of the second disk. According to this disk apparatus, centering of the disk to the motor can be carried out easily and accurately.

Figure 2:
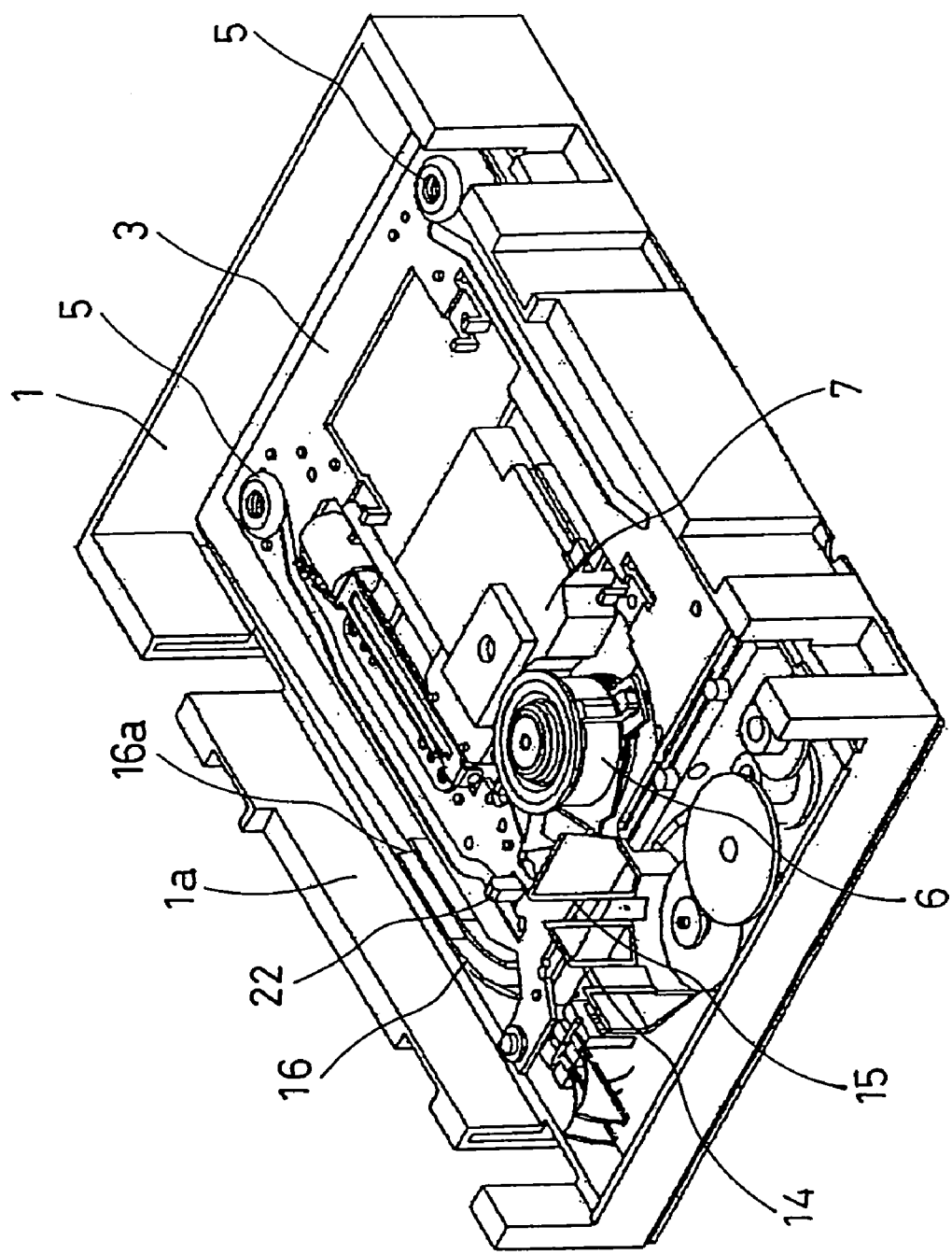
FIG. 2 is a perspective view of a mechanical base according to one embodiment of the present invention.

Hereinafter, an embodiment of the present invention is described below with reference to the attached drawings. FIG. 1 is a perspective view of a loading device in a disk apparatus according to one embodiment of the present invention. FIG. 2 is a perspective view of a mechanical base of the loading device, from which a top plate 4 and a tray 2 shown in FIG. 1 are detached.

Figure 3A:
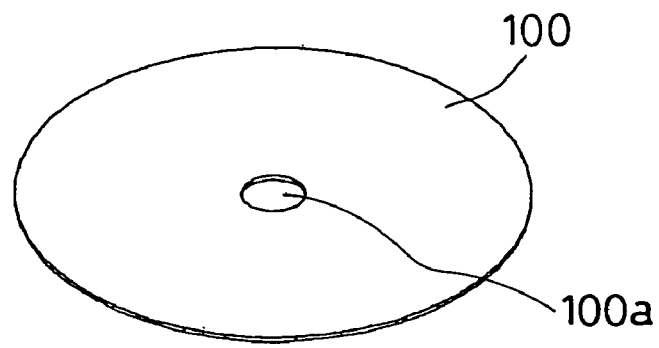
FIG. 3A is a perspective view showing one example of a bare disk.
Figure 3B:
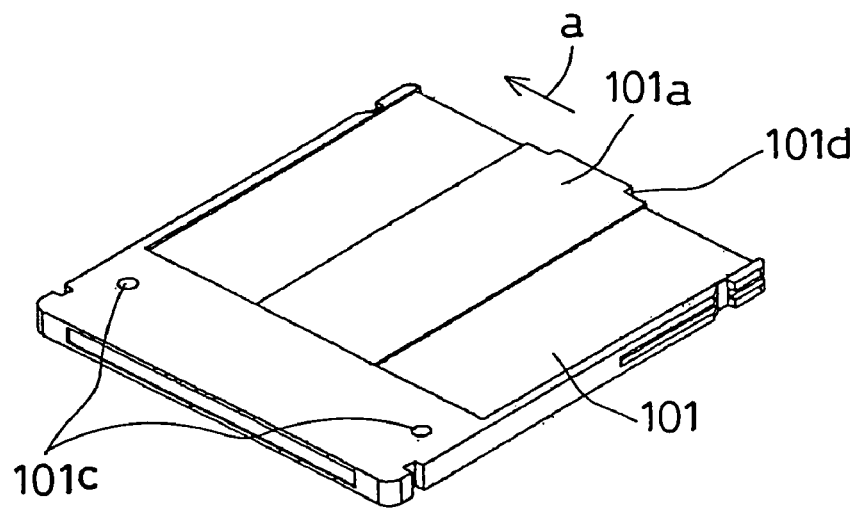
FIG. 3B is a perspective view showing one example of a cartridge with its shutter in a closed state.
Figure 3C:
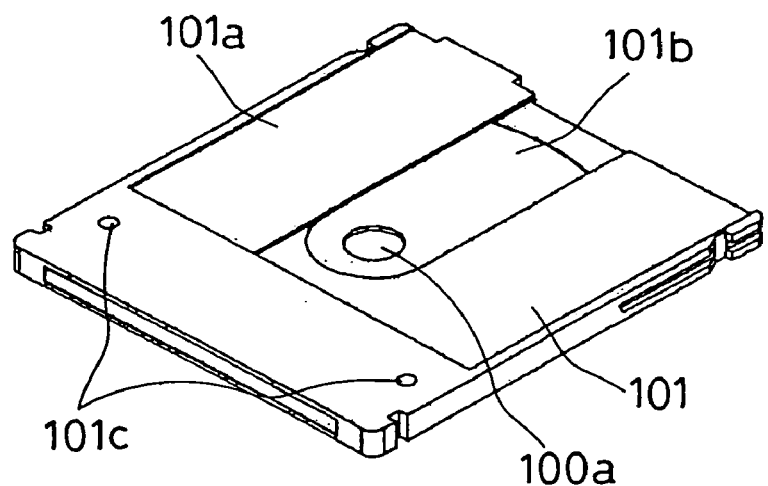
FIG. 3C is a perspective view showing one example of a cartridge with its shutter in an open state.

FIGS. 3A–3C are perspective views of a disk. FIG. 3A is a perspective view of a bare disk in which a recording-reproducing face is exposed (hereinafter referred to as a 'bare disk'). FIG. 3B is a perspective view of a disk (hereinafter referred to as a 'cartridge') formed by housing a bare disk in a cartridge. The cartridge 101 has a shutter 101a and a hole 101c.

FIG. 3C is a perspective view of the cartridge 101 with the shutter 101a in an open state. Hereinafter, an expression of "disk" denotes both a bare disk and a cartridge.

For the loading device shown in FIG. 1, the tray 2 is in an eject state, so that a disk can be mounted thereon. A general explanation about the structures and operations of the respective portions of the loading device will be followed by detailed explanation about each of the portions. In the loading device shown in FIGS. 1 and 2, an electric substrate 11 is fixed on the bottom of the mechanical base 1 shaped as a box, and on the upper part, the top plate 4 is fixed. Between the electric substrate 11 and the top plate 4, a lift base 3 provided with a motor 6 (FIG. 2) or the like for rotating the disk is set. As shown in FIG. 2, the lift base 3 is attached to the mechanical base 1 via a clamper 5, and it can raise/lower to approach or leave the tray 2.

A clamper 10 functions to hold the disk on the motor 6. The clamper 10 can raise/lower by means of a slider 9, and it assumes the lowered position for a rotation of the disk. As shown in FIG. 1, when the tray 2 is in a state for enabling ejection of the disk, the clamper 10 rises to a position not to be contacted with the disk.

A couple of bosses 2a for positioning the cartridge are provided on the tray 2. By inserting the bosses 2a into holes 101c (FIG. 3B) of the cartridge 101, the cartridge 101 is positioned on the tray 2.

(First Embodiment)

Figure 4:
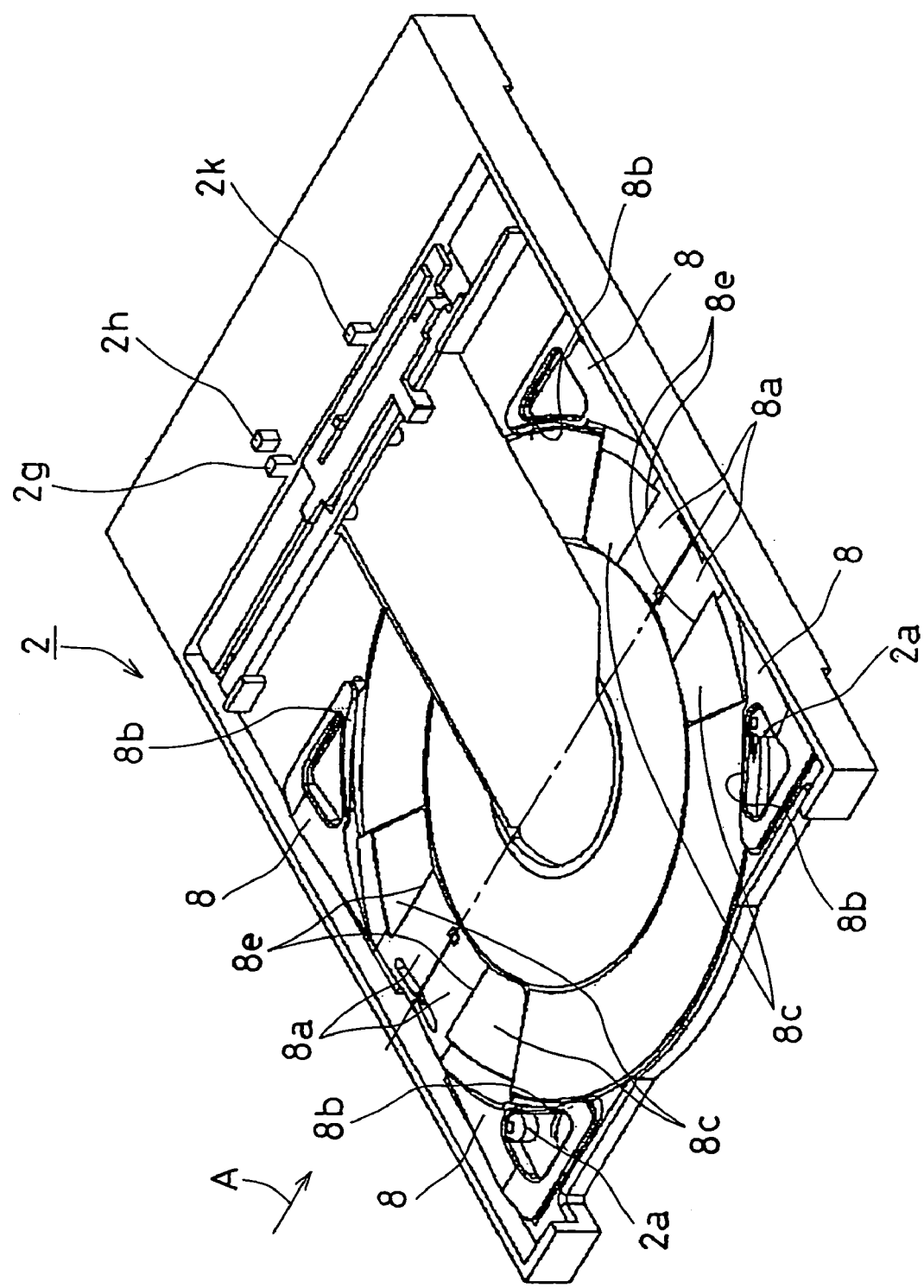
FIG. 4 is a perspective view of a tray according to one embodiment of the present invention.

FIG. 4 is a perspective view of a tray 2 according to this embodiment. On the tray 2, disk guides 8 as a means for disk position controllers are attached. Two disk guides 8 are combined to form a set of disk guides, and a set of disk guides are arranged on each side of the tray 2. In a state in which a bare disk 100 with a mountable maximum diameter is mounted on the tray 2, the bare disk 100 is mounted on four disk guides 8. The position of the bare disk 100 in the radial direction is controlled by sidewalls 8b of the disk guides 8.

Figure 7A:
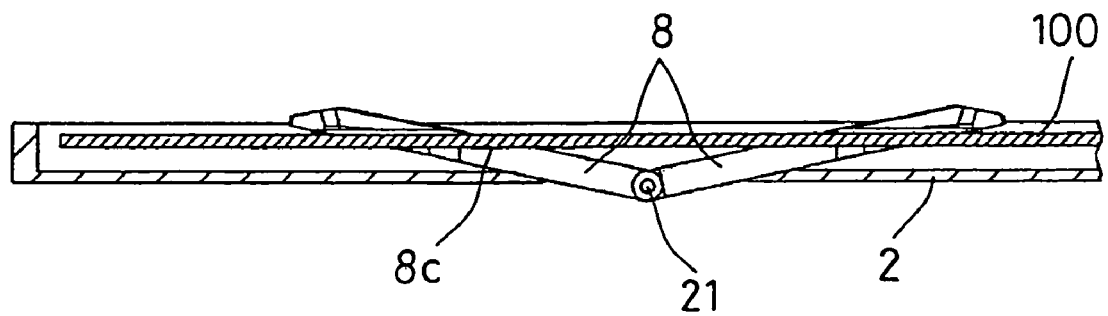
FIG. 7A is a cross-sectional view showing a mount state of a bare disk according to one embodiment of the present invention.
Figure 7B:
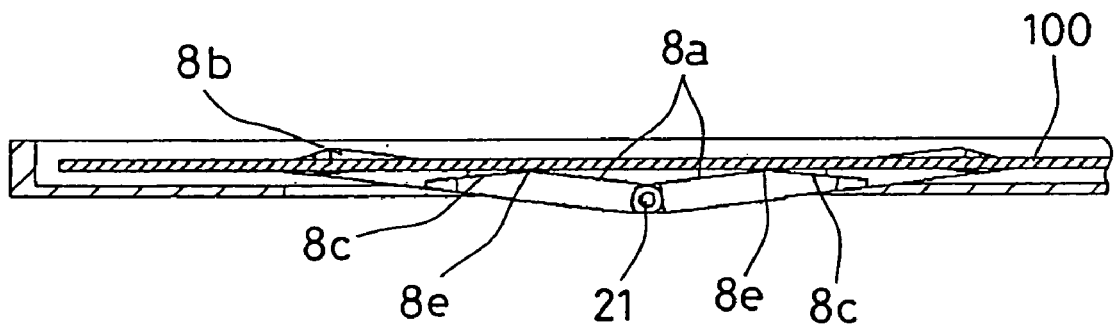
FIG. 7B is a cross-sectional view showing a mount state of a bare disk according to another embodiment of the present invention.

FIG. 7B shows a set of disk guides viewed from a side face direction (a direction identified with an arrow 'A' in FIG. 4). For clarification, the tray 2 is shown in the cross section in this figure and also in FIGS. 7A and 7C.

In FIG. 7B, a bare disk 100 is mounted on the disk guide 8. More specifically, the bare disk 100 is mounted on an intersection 8e of a face 8a and a face 8c different from each other in the inclination angle. The disk guide 8 can rotate about a rotation axis 21. The long-and-short-dashed line in FIG. 4 denotes a centerline of the rotation axis 21. Each of the disk guides 8 is applied with a spring pressure by a spring as a biasing member attached to the rotation axis 21. This force is applied in the direction to separate each disk guide 8 above from the main face of the tray 2. As a result, the bare disk 100 mounted on the disk guide 8 is held in a state floating above the main face of the tray 2.

The amount of upward displacement of the disk guide 8 can be set in two stages by a locking system. In this embodiment, the position can be switched to a first position in which the disk guide 8 is locked by the locking system and limited in its upward displacement (FIG. 7B) and a second position in which the locking system is released to displace the disk guide 8 further upward (FIG. 7A) in comparison with the first position.

The locking system is used, e.g., for fitting a recess of a disk guide 8 with a convex of the tray 2. The locked condition can be released when a user releases the fitting. In this case, at the first position, the recess of the disk guide 8 is contacted with the convex of the tray so that the rotation upward is restricted. When the user raises the disk guide 8 so that the recess of the disk guide 8 surmounts the convex of the tray, the locked condition is released, and thus the disk guide 8 is displaced to the second position.

At the first position as shown in FIG. 7B, tips of the bosses 2a of FIG. 4 are positioned below the lower face of the disk guide 8. Therefore, the bosses 2a will not contact with a bare disk at the time of mounting the bare disk on the tray 2, and thereby flaws on the bare disk 100 can be prevented.

Figure 5:
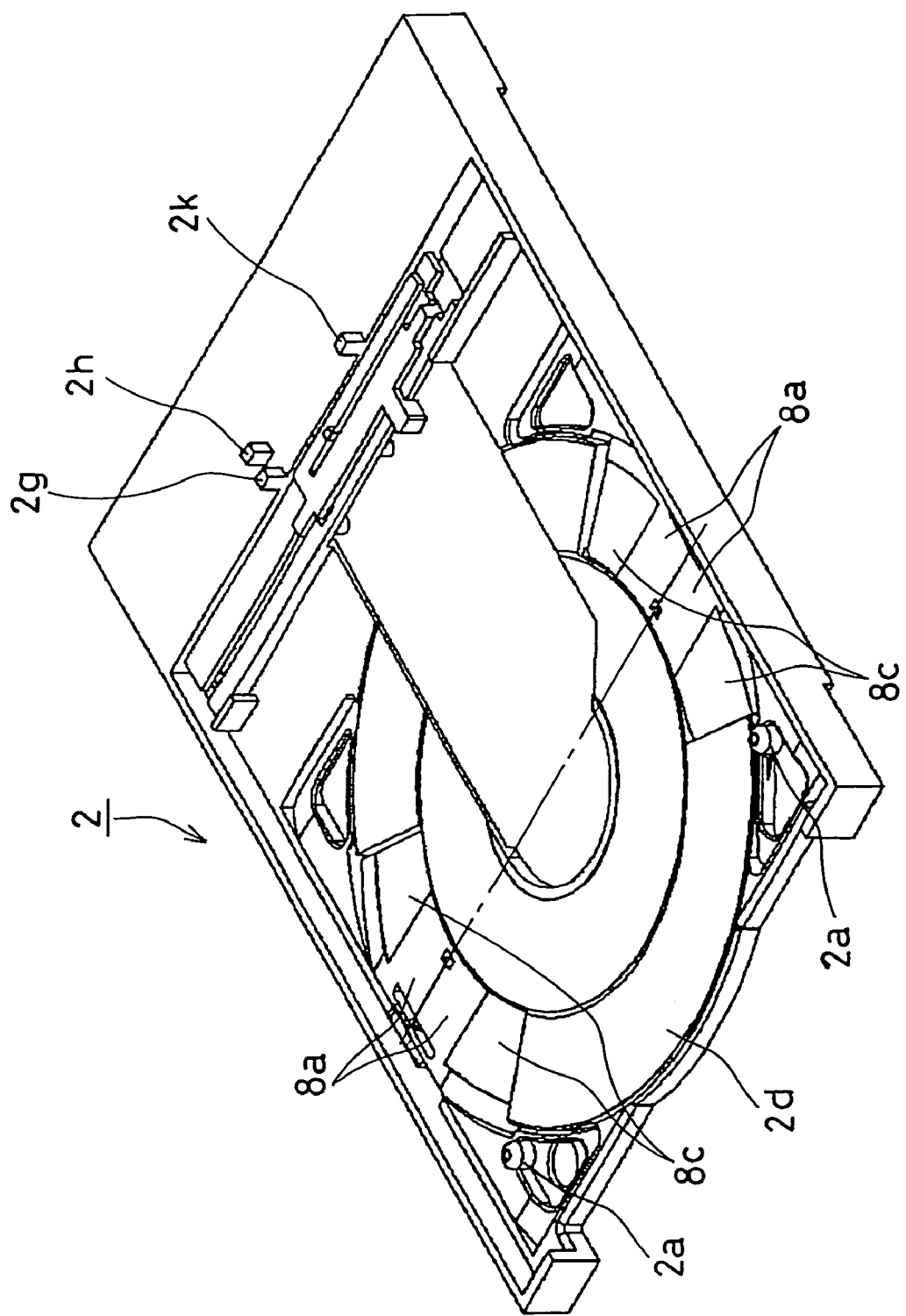
FIG. 5 is a perspective view of a tray according to one embodiment of the present invention.
Figure 7C:
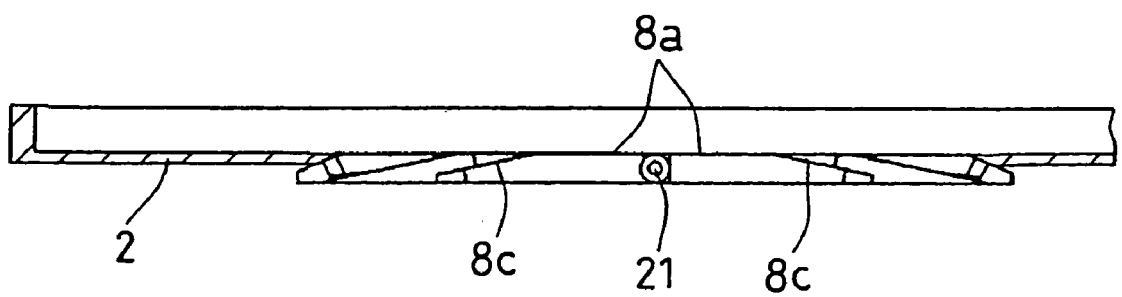
FIG. 7C is a cross-sectional view showing a mount state of a cartridge.

FIG. 5 is a perspective view of a tray 2 on which a cartridge (not shown) is mounted. FIG. 7C shows a set of disk guides of FIG. 5 viewed from the side face direction. Because the weight of the cartridge heavier than the bare disk the disk guide 8 is displaced further below in comparison with the state of FIG. 7B. As a result, the bosses 2a protrude from the aperture of the disk guide 8. Namely, by loading the cartridge, the bosses 2a are inserted into the apertures 101c of the cartridge (FIG. 3), thereby securing positioning of the cartridge.

Figure 6:
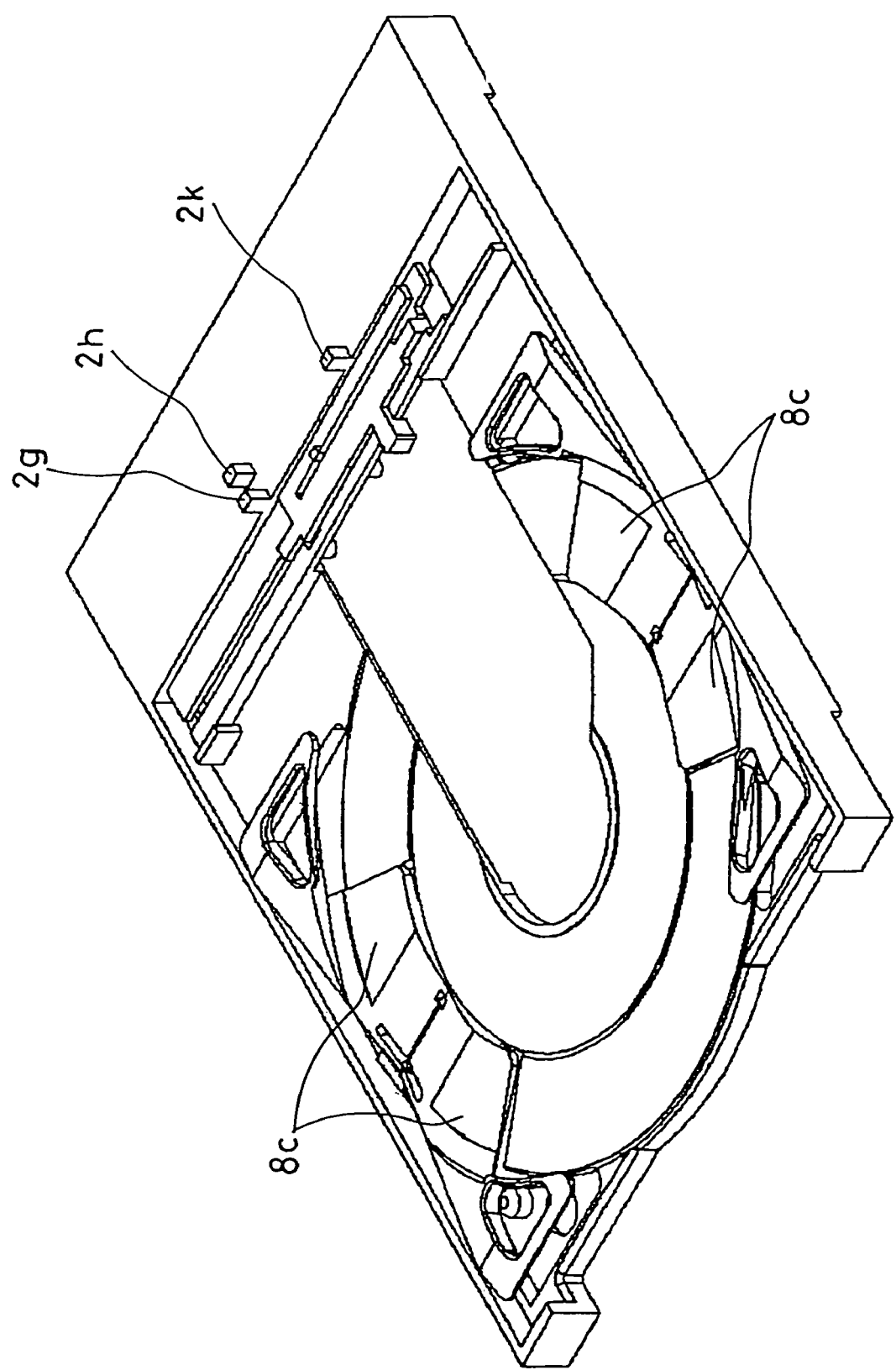
FIG. 6 is a perspective view of a tray according to one embodiment of the present invention.
Figure 8A:
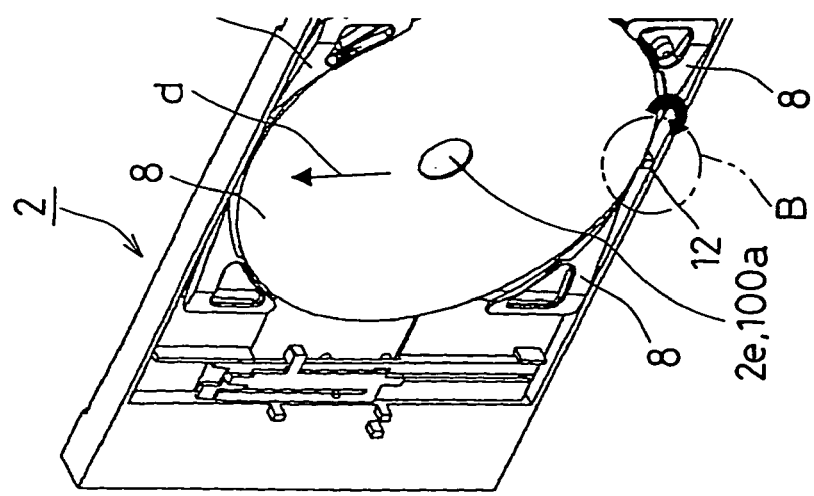
FIG. 8A us a perspective view of a tray in a vertically-placed state according to one embodiment of the present invention.
Figure 8B:
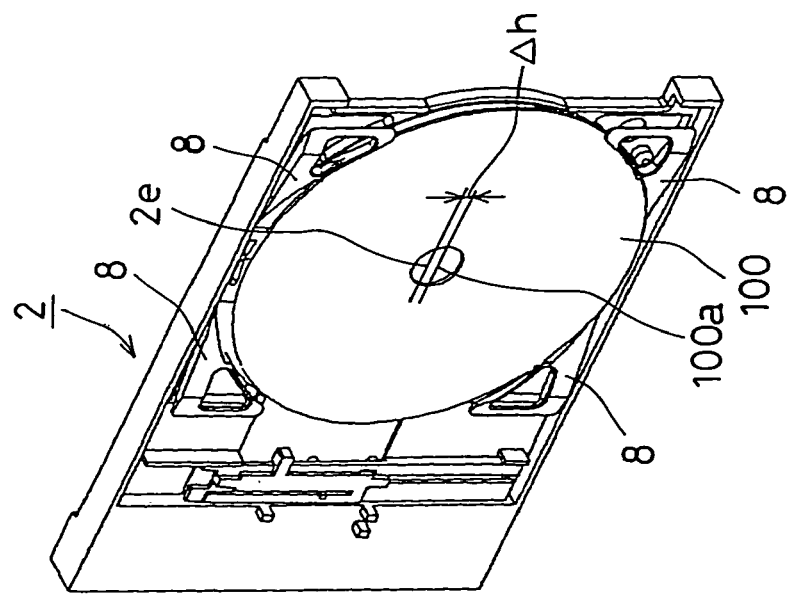
FIG. 8B is a perspective view showing displacement of a bare disk in a vertically-placed tray according to one embodiment of the present invention.
Figure 8C:
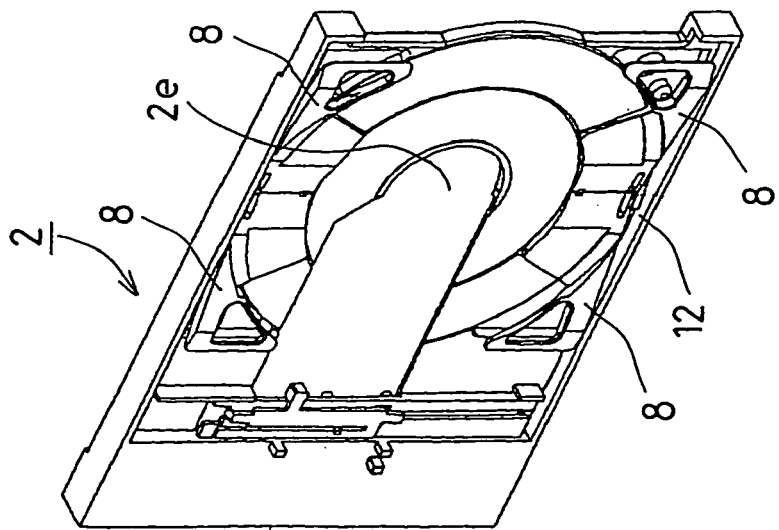
FIG. 8C is a perspective view showing correction of a bare disk in a vertically-placed tray according to one embodiment of the present invention.

FIG. 6 is a perspective view of the tray 2 in a state in which the locking of the disk guide 8 is released. That is, the disk guide 8 in this drawing is at the second position. When the disk guide 8 is at the first position, the tray 2 must be set in a transverse (horizontal) direction for mounting a disk. On the other hand, when the disk guide 8 is at the second position, a bare disk can be mounted on the tray 2 set in a perpendicular (vertical) direction. FIGS. 8A–8C are perspective views respectively showing the tray 2 set vertically.

FIG. 8A is a perspective view of a state not mounting a disk, while FIG. 8B shows a state of mounting a bare disk 100 on the tray 2 that is set vertically. In the state of FIG. 8B, the bare disk 100 hangs under its own weight, and it is held by disk guides 8 provided at two points on one side (2 points at the lower side).

Figure 9A:
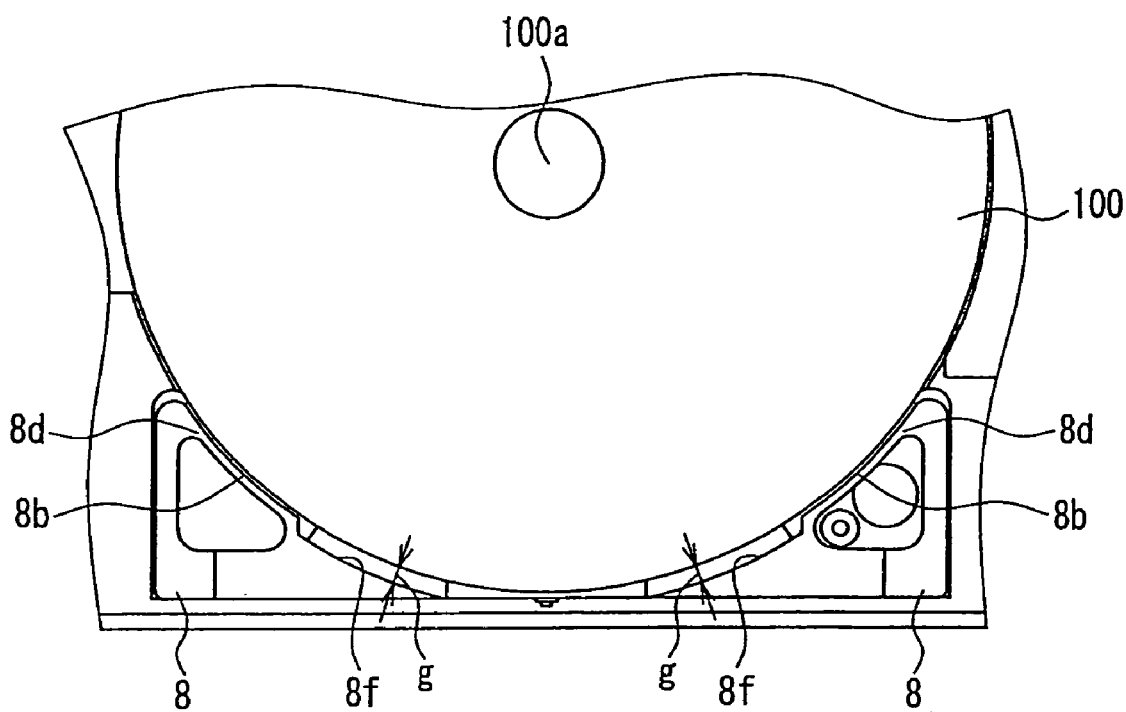
FIG. 9A is an enlarged view of a main part in a horizontally-placed tray according to one embodiment of the present invention.

FIG. 9 is referred to for specifically explaining this state. FIG. 9A is an exploded view of a main part in a state in which the tray 2 is set horizontally. In this state, there are provided gaps 'g' between the periphery of the bare disk 100 and sidewalls 8f of the disk guides 8.

Figure 9B:
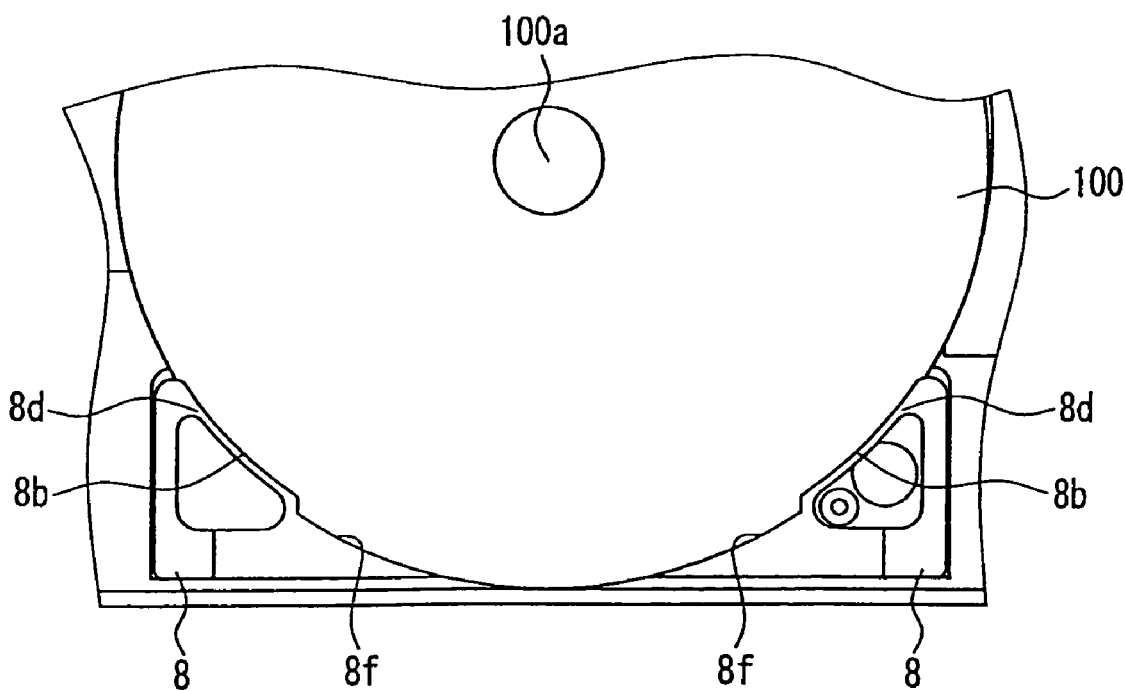
FIG. 9B is an enlarged view of a main part in a vertically-placed tray according to one embodiment of the present invention.

FIG. 9B is an exploded view of a main part in a state in which the tray 2 is set vertically. When the bare disk 100 is mounted on the vertically-set tray 2, as described above, the bare disk 100 hangs under its own weight. As a result, the periphery of the bare disk 100 is contacted with the sidewalls 8f of the disk guides 8 so as to eliminate the gaps between the periphery of the bare disk 100 and the sidewalls 8f of the disk guides 8.

In this case, side faces 8b of protruding portions 8d of the disk guides 8 extend inward (toward a center 100a of the bare disk 100) further than the sidewalls 8f. Therefore, the peripheral face of the bare disk 100 is mounted partially on the sidewalls 8f, and the bare disk 100 is arranged so that the surface overlaps partially with the protruding portions 8d. That is, the protruding portions 8d serve to prevent the bare disk 100 from falling over from its vertically-held state and disengaging from the tray 2.

As mentioned above, this embodiment contributes to downsizing of the apparatus since the disk guide 8 will not protrude at the lower part of the tray 2. Furthermore, by switching the position of the disk guides 8 between the first position and the second position, the apparatus in this embodiment can be applied to both the vertical and horizontal placement of disks.

Here, in a case that the disk guide 8 is set at the first position for placing the disk horizontally, as shown in FIG. 7B, the position of the sidewalls 8b and the position of the peripheral face of the bare disk match substantially with each other. Thereby, the position of the bare disk in the main face direction will be restricted by the sidewalls 8b. This configuration will not result in overlapping of a part of the main face of the bare disk 100 and the protruding portions 8d (FIG. 9B). Therefore, in a case of horizontally placing a bare disk it is possible to prevent the bare disk from slipping below the extending portion 8d and becoming difficult to take out.

In this embodiment, the explanation refers to an example using a locking member to switch the first and second positions of the disk guides 8. The locking member can be omitted if any other configuration can be applied for switching. For example, it is possible that the disk guides 8 are at the second position when the disk guides 8 are unloaded, while the disk guides 8 are at the first position as shown in FIG. 7B under its own weight when the bare disk is placed horizontally. This setting is available by adjusting the spring pressure used for applying a force to the disk guides 8.

(Second Embodiment)

Next description is provided about correction of position of the bare disk 100. In FIG. 8A, 2e denotes a center of the disk mounting portion of the tray 2. The center 2e will be positioned on the rotation axis of the motor 6 (FIG. 2) when the loading is completed. As mentioned above, in a case of setting the tray 2 vertically, the bare disk 100 will hang under its own weight. In the example of FIG. 8B, the center 100a of the bare disk 100 hangs by Δh in comparison with the center 2e of the tray.

Centering of the bare disk 100 to the motor 6 will be difficult if the loading is completed in a state in which the center 100a is displaced by Δh. In this embodiment, a correction lever as a correcting means is provided to correct the displacement amount Δh. In the state shown in FIG. 8C, the bare disk 100 is pushed up by a correction lever 12 in a direction identified with an arrow 'd', and the center 100a of the bare disk 100 approaches the center 2e of the tray.

Figure 10A:
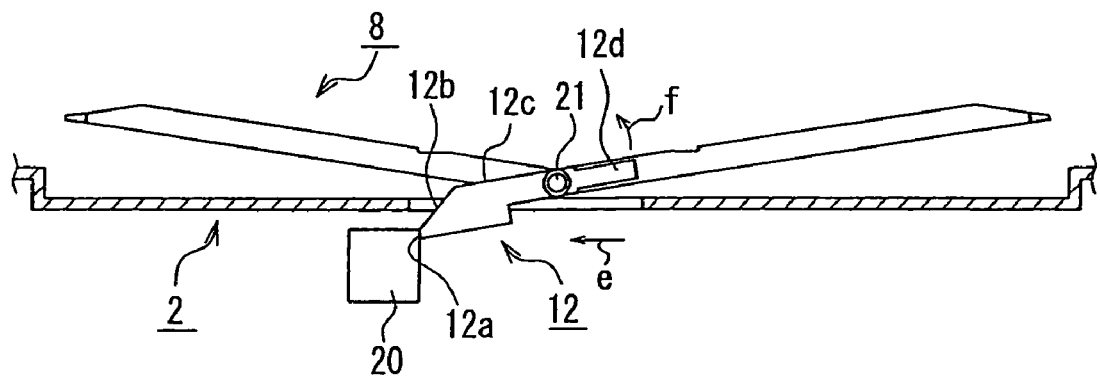
FIG. 10A is a view for explaining operations of a correction lever according to one embodiment of the present invention.
Figure 10B:
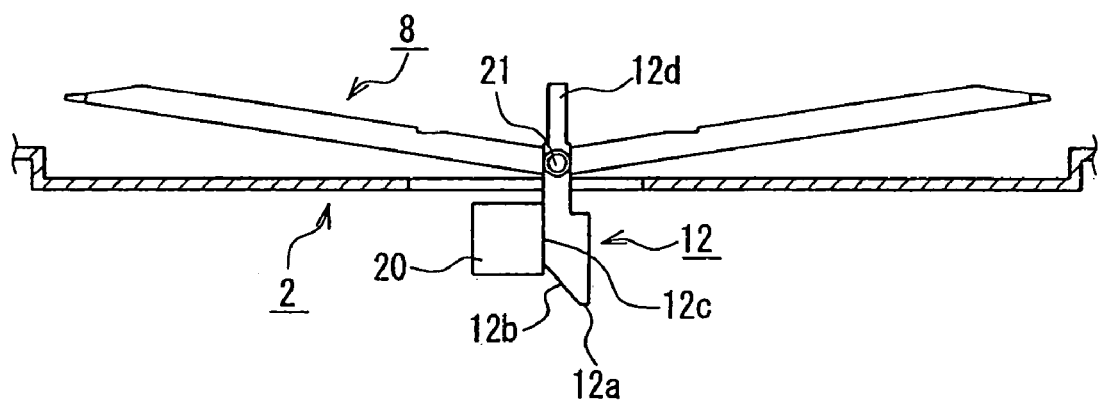
FIG. 10B is a view showing a correction lever at a loading position according to one embodiment of the present invention.

Operations of the correction lever 12 will be described specifically by referring to FIGS. 10A and 10B. Each of FIGS. 10A and 10B is a side view of a main part of the tray 2. For clarification, cross sections of the tray 2 are shown. FIG. 10A shows the tray 2 in loading, where the tray 2 is shifting in the direction identified with an arrow 'e'. This figure illustrates the correction lever 12 having a tip 12a being contacted with a projection 20. The correction lever 12 is attached at the rotation axis 21 of the disk guide 8, and rotatable about the rotation axis 21.

To the correction lever 12, a spring pressure for rotating the lever in a direction opposite to the direction identified with an arrow 'f' is applied. Therefore, in a state before the tip 12a of the correction lever 12 is contacted with the projection 20 (i.e., an unloaded state), the correction lever 12 is contacted with the disk guide 8 at the right side while being subject to the spring pressure.

The projection 20 is fixed onto the inner wall face 1a (FIG. 2) of the mechanical base 1. Therefore, when the tray 2 is shifting further in the 'e' direction from the position of FIG. 10A, an inclined face 12b slides on the projection 20, and the correction lever 12 rotates in the 'f' direction while resisting the spring pressure applied to the correction lever 12.

Figure 11:
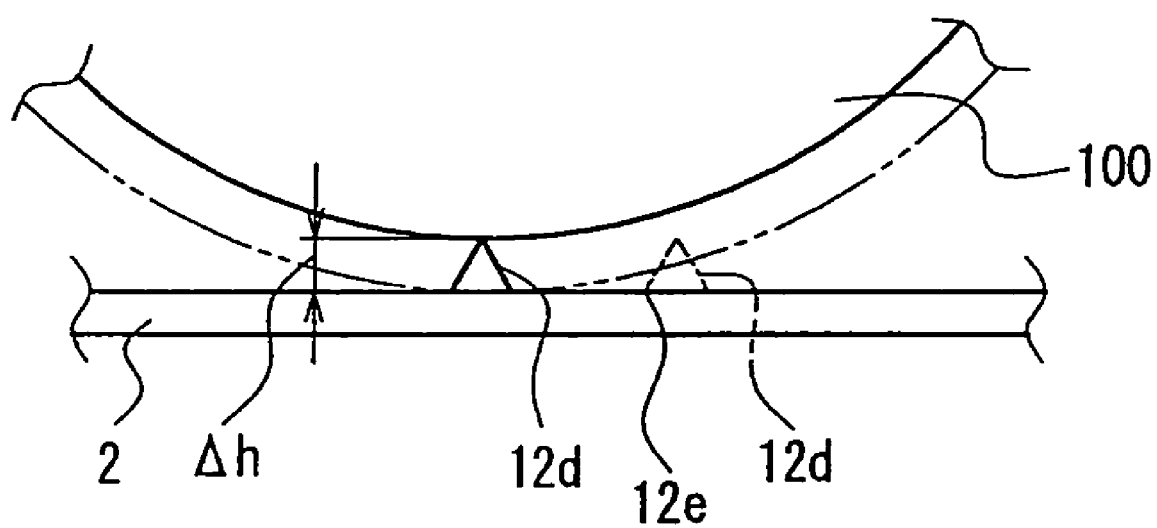
FIG. 11 is a view for explaining states of a bare disk before and after correction according to one embodiment of the present invention.

FIG. 10B shows that the loading is completed. A flat face of the projection 20 and a flat face 12c of the correction lever 12 are contacted with each other, and the protruding portion 12d is perpendicular to the main face of the tray 2. FIG. 11 shows this from the surface of the bare disk 100. FIG. 11 corresponds to an exploded view of the part 'B' in FIG. 8C. An alternate long and two short dashes line indicates a bare disk 100 before the correction, and it corresponds to the state of FIG. 9B. The solid line indicates the bare disk 100 after the correction.

The protruding portion 12d of the correction lever 12 indicated with the alternate long and two short dashes line are positioned on the back face of the bare disk 100, corresponding to the state of FIG. 10A. As mentioned above, with the tray 2 shifting to the loading position, the protruding portion 12d of the correction lever 12 rotates in the 'f' direction. Therefore, when an edge part 12e of the protruding portion 12d slips below the peripheral face of the bare disk 100 (i.e., squeezing into spacing between the peripheral face of the bare disk 100 and the tray 2), the protruding portion 12d raises the bare disk 100. In FIG. 11, the protruding portion 12d raises the bare disk 100 by Δh, and the center 100a of the bare disk 100 approaches the center 2e of the tray.

Correction by means of the correction lever is required when mounting a bare disk. However, in a case of mounting a cartridge, the cartridge will be pushed out if the correction lever operates. For preventing this, the operation of the correction lever must be stopped in a case of mounting a cartridge.

Figure 12:
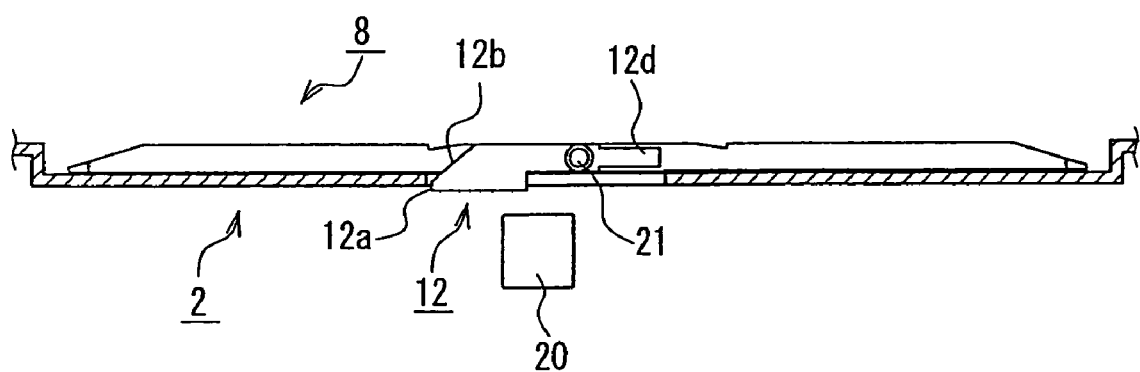
FIG. 12 is a view showing a state of a correction lever at the time of mounting cartridge according to one embodiment of the present invention.

FIG. 12 is a side view of a disk guide portion in a case of mounting a cartridge. By mounting a cartridge, the disk guide 8 rotates about the rotation axis 21 toward the tray 2.

As mentioned above, the correction lever 12 in an unloaded state is in contact with the right-hand disk guide 8 while being applied with a spring pressure. When the disk guide 8 rotates toward the tray 2 in this state, the correction lever 12 will rotate together. The correction lever 12 stands horizontally in the state of FIG. 12. That is, since the correction lever 12 retracts toward the tray 2, the correction lever 12 passes the projection 20 without contacting with the projection 20. As a result, the correction operation by means of the correction lever 12 can be stopped when mounting a cartridge, and thus the cartridge can be prevented from being pushed out of the tray 2. In a case of mounting a cartridge, either the correction lever 12 or the projection 20 can be formed with an elastic material such as a plate spring for stopping operations of the correction lever 12. In this case, the elastic material can be set to have a spring pressure for enabling correction of the bare disk and also bending of the elastic material at the time of mounting the cartridge so as to prevent generation of a force that will push the cartridge up.

The correction means is not limited to the above-described combination of a correction lever and a projection, but it can be configured by providing a protruding portion made of an elastic material such as a plate spring on the side face 1$a$ (FIG. 2) of the mechanical base 1. In this case, the protruding portion is positioned so that the protruding portion and the bare disk peripheral face will engage with each other when the tray 2 reaches the loading position. According to this configuration, the protruding portion will press the peripheral face at the loading position, thereby correcting the bare disk position.

Also in this case, the spring pressure of the elastic material is minimized as long as the bare disk position can be corrected, and when mounting the cartridge, the protruding portion as the elastic material is contacted with the cartridge at the loading position, so that the elastic material will be bent to retract toward the side face 1$a$ (FIG. 2) of the mechanical base 1.

The above description for this embodiment relates to operations of the correction lever for a case of vertically placing the bare disk. The correction lever will function similarly even for a case of horizontally placing the bare disk so as to work for correcting the position of the bare disk in the main face direction.

(Third Embodiment)

The following description is about opening/closing a shutter 101$a$ of a cartridge 101, and a clamper 10 for clamping the disk 100 on the disk motor 8.

As shown in FIG. 3B, a bare disk 100 is housed in the cartridge 101. In an ordinary state, the shutter 101$a$ is biased by a spring so as to be closed as shown in this figure, and thus the bare disk 100 is not exposed.

When the shutter 101$a$ in FIG. 3B slides in the 'a' direction, a part of the bare disk 100 is exposed as shown in FIG. 3C. In this state, information can be recorded on or reproduced from the bare disk 100. There is provided a space 101$b$ above the exposed part, and there is a similar space below the exposed part. Though a head 7 (FIG. 2) is arranged at a position corresponding to the lower space in general, there is no specific structure in the upper space.

For opening/closing the shutter 101$a$, an exclusive lever or cam is required. These elements are arranged in general on a top plate 4 opposing the head 7 with respect to the cartridge 101. Since an exclusive space for arranging a lever or a cam must be provided to the space above the cartridge 101 in this structure, the apparatus will be upsized.

In this embodiment, an opener as a means for opening/closing the shutter 101$a$ is provided on the tray 2, and an opening/closing system is provided for the face opposing the top plate 4 with respect to the cartridge 101 (opposite to the mounting face of the tray 2). Specific explanations will follow with reference to the attached drawings.

Figure 13A:
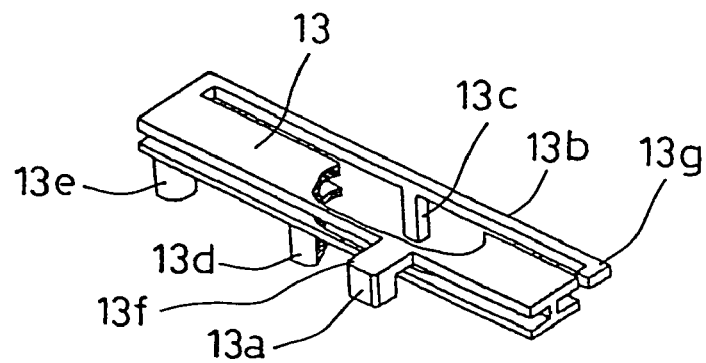
FIG. 13A is a perspective view of an opener according to one embodiment of the present invention.
Figure 13B:
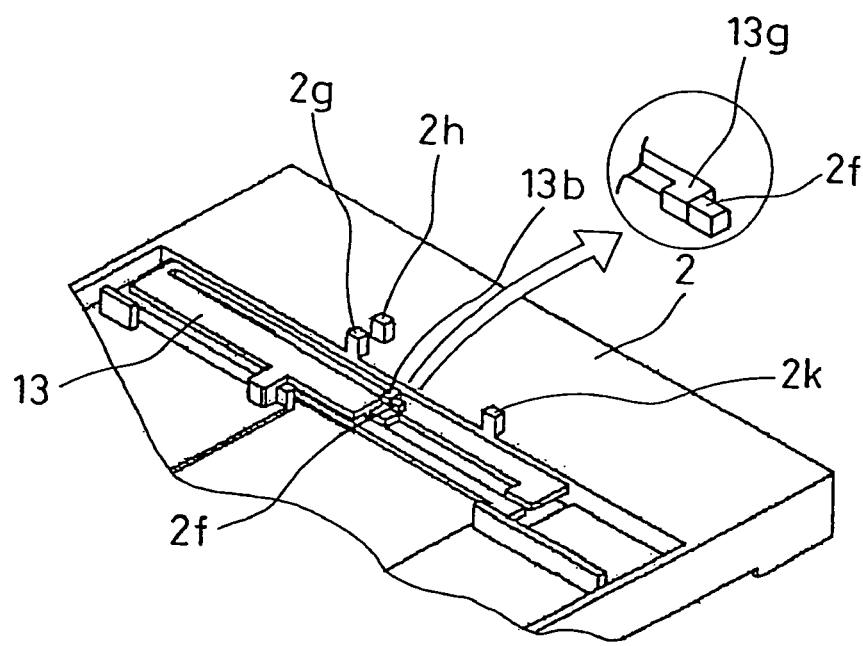
FIG. 13B is a perspective view of a main part of a tray with its cartridge shutter in an open state according to one embodiment of the present invention.
Figure 13C:
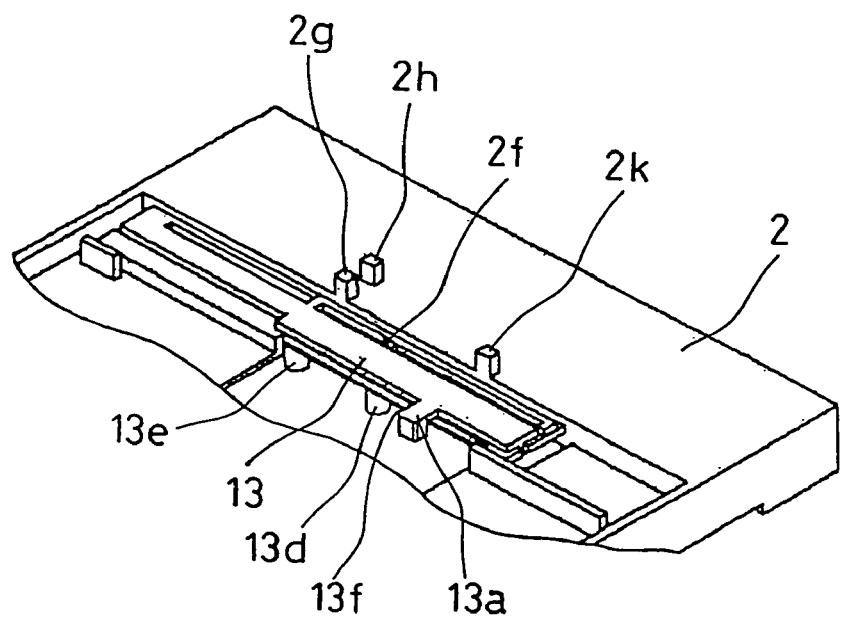
FIG. 13C is a perspective view of a main part of a tray with its cartridge shutter in a closed state according to one embodiment of the present invention.

FIG. 13A is a perspective view of an opener 13 according to this embodiment. FIG. 13A is sectioned partially for showing an axis 13$c$. FIG. 13B is a perspective view showing the shutter 101$a$ in an open state, and FIG. 13C is a perspective view showing the shutter 101$a$ in a closed state. FIGS. 14 and 15 are plan views for explaining operations of the opener according to this embodiment. FIGS. 14 and 15 illustrate main parts of the mechanical base 1 and the tray 2 for the purpose of explaining the operations of the opener, and the tray 2 is shown in a partially-sectional view. Illustration of a cartridge is omitted for clarifying the members relating to explanation, and the opener 13 is partially omitted as well from FIGS. 14 and 15.

Figure 14A:
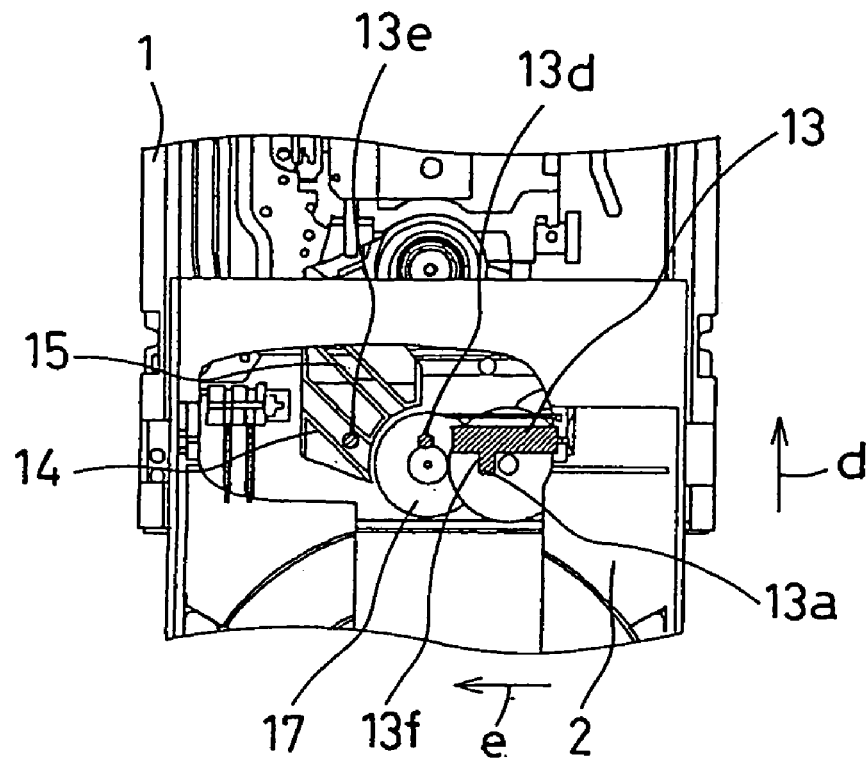
FIG. 14A is a view showing a position of an opener in an eject state according to one embodiment of the present invention.

Operations of the opener 13 are described below with reference to FIGS. 13–15. FIG. 14A shows the tray 2 in an eject state. This state corresponds to FIG. 13C. In this state, the axis 13$e$ as an engaging member engages with the cam 14 so as to position the opener 13. The cam 14 as a guiding member is formed with walls facing each other with a predetermined space. The cams 15 and 16 as guiding members are formed similarly. When the opener 13 is at the position shown in FIG. 14A, a side face 13$f$ of a convex 13$a$ of the opener 13 corresponds to a side face 101$d$ (FIG. 3B) of a convex of the shutter 101$a$, and thus the cartridge 101 can be loaded onto the tray 2.

When the tray 2 slides from this state in a loading direction (a direction identified with an arrow 'd'), the axis 13$e$ moves along the wall face of the cam 14. Thereby, the opener 13 slides in a direction identified with an arrow 'e' as the width direction of the apparatus, proceeding with the tray 2 in the 'd' direction. In this case, since the side face 13$f$ of the convex 13$a$ of the opener 13 and the side face 101$d$ (FIG. 3B) of the convex of the shutter 101$a$ engage, the opener 13 opens the shutter 101$a$ during its sliding in the 'e' direction.

Figure 14B:
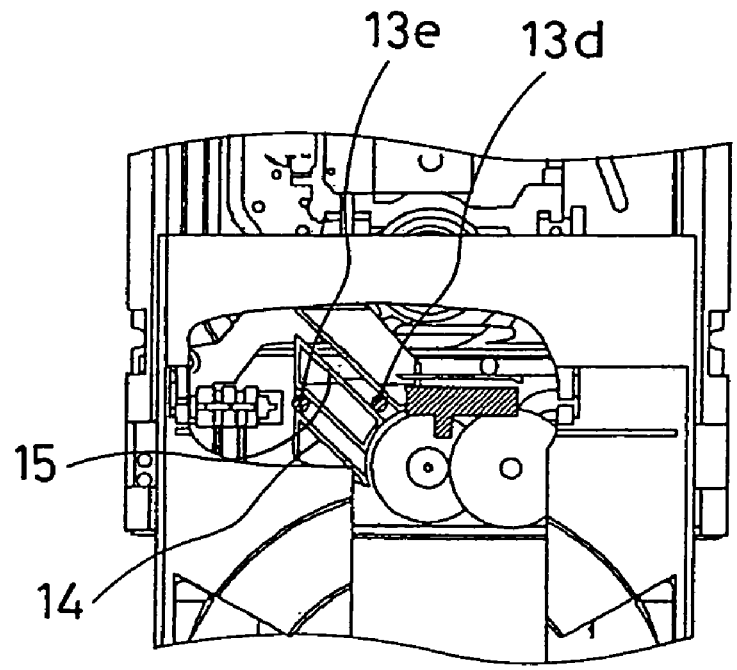
FIG. 14B is a view showing a position of an opener in a tray conveyance state according to one embodiment of the present invention.
Figure 15A:
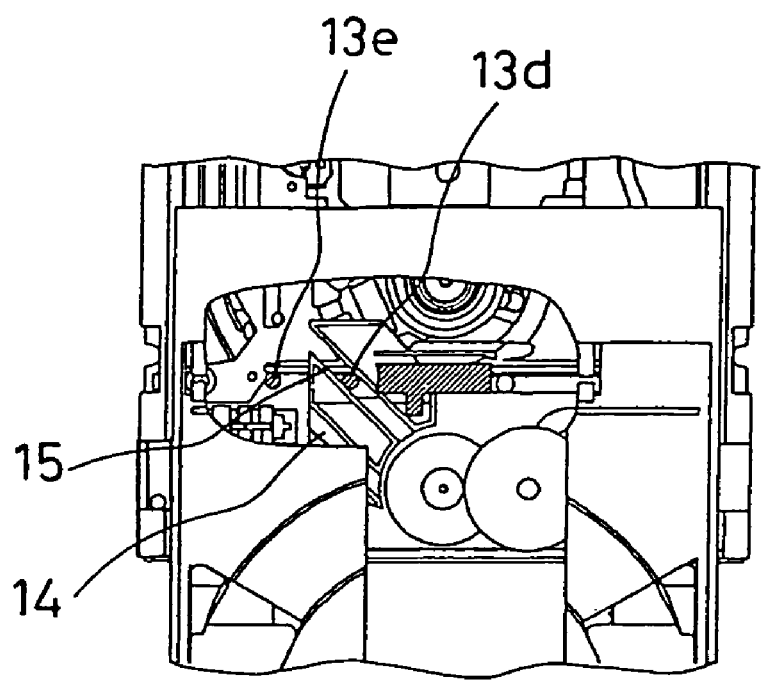
FIG. 15A is a view showing that an axis 13e disengaged from a cam in a tray conveyance state according to one embodiment of the present invention.

Due to the sliding of the opener 13 in the 'e' direction, the axis 13$d$ that is integrated with the opener 13 and an engaging means also slides in the 'e' direction. FIGS. 14 and 15 respectively show the position of the opener 13, the position changing with the tray 2 shifting in the 'd' direction. FIG. 14B shows the axis 13$d$ engaging with the cam 15. Subsequently therefore, as shown in FIG. 15A, the axis 13$e$ is disengaged from the cam 14 and the axis 13$d$ moves along the wall face of the cam 15, so that the opener 13 slides in the 'e' direction.

Figure 15B:
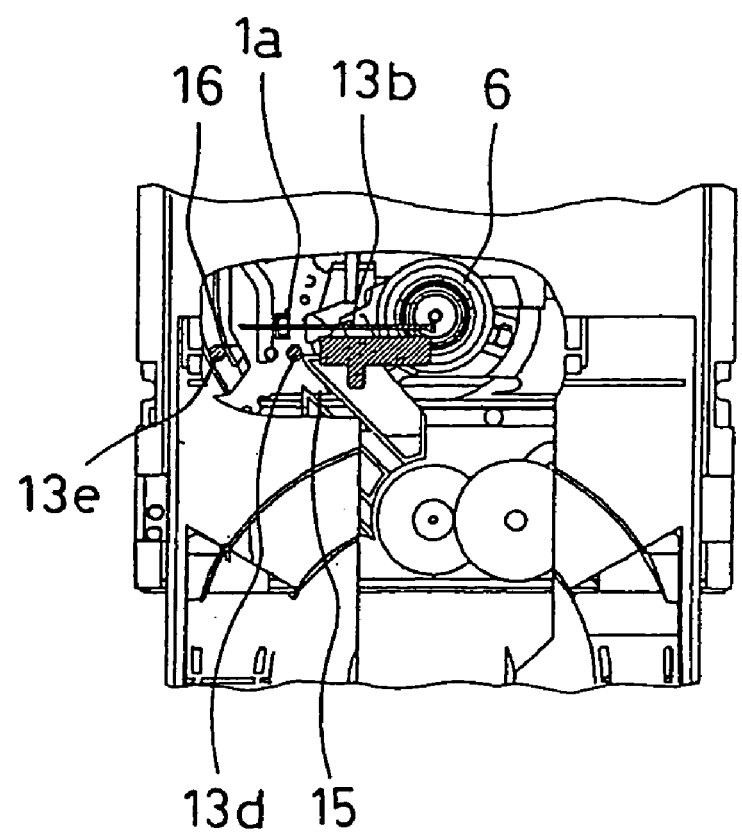
FIG. 15B is a view showing that the axis 13e engages with another cam in a tray conveying state according to one embodiment of the present invention.

In the state of FIG. 15B, the axis 13$d$ is disengaged from the cam 15, and the axis 13$e$ is newly engaging with a cam 16. Thereby, in the subsequent operations, the axis 13$e$ moves along the wall face of the cam 16, and thus the opener 13 will slide in the 'e' direction until the shutter 101$a$ is opened. As mentioned above, in this embodiment, respective axes of the opener 13 move along three cams that are arranged independently, and thus the opener 13 slides in a direction for opening the shutter 101$a$.

The cams might be formed in a continuous shape. However, since a lift base 3 is set on the mechanical base 1, it will be difficult to secure a space for setting one continuous cam without being interrupted by the lift base 3. For this reason, in a conventional structure, an exclusive space is provided to the surface facing the top plate 4 so as to arrange a lever and a cam on the upper part of the cartridge 101.

In this embodiment, there are provided three cams that are independently arranged, and two axes that are engaged with these cams and integrated in an opener. When a tray is conveyed for a predetermined distance, an engagement of a cam and an axis is switched to another engagement of other cam and the axis, and thus the opener slides while the tray is conveyed. That is, the opener slides as a result of work shared by a combination of plural cams and axes, so that a cam is provided onto the mechanical base 1 so as to downsize the apparatus.

According to this configuration, when a set of cam and axis engage, axis/axes other than the engaging axis will not engage necessarily with cam(s), except for the time of switching the engagement as shown in FIG. 14B. When the axis 13e engages with the cam 14 as shown in FIG. 14A, the axis 13d does not engage with a cam. Therefore, there is no need for forming a cam at a part of the mechanical base 1 corresponding to the axis 13d. In other words, since there is no need for arranging one cam continuously according to this embodiment, spaces can be used effectively for any other objects (in this embodiment, for setting of a gear 17), and also facilitating downsizing of the apparatus.

(Fourth Embodiment)

The opener 13 in FIG. 13B is in a state in which the shutter 101a of the cartridge 101 is opened completely. In this state, as shown in the partially enlarged view of FIG. 13B, a locking portion 13g as an opener holder at the tip of a resin spring 13b engages with a convex 2f as an opener holder formed on the tray 2. Thereby, the opener 13 stops without sliding against a restoring force of the spring acting in a direction for closing the shutter 101a.

For engaging the locking portion 13b with the convex 2f, the locking portion 13b must surmount the convex 2f. In this engagement, during conveyance of the tray 2, the projection 13c (FIG. 13A) of the opener 13 surmounts the projection 22 (FIG. 2) formed on the mechanical base 1, so that the resin spring 13b bends upward and thus the locking portion 13b surmounts the convex 2f.

Though the axis 13e of the opener 13 engages with the cam 16 in the state of FIG. 15B, in the state of FIG. 13B, the opener 13 stops in a state in which the shutter 101a is open. Therefore, the axis 13e of the opener 13 will not be required to engage with the cam 16 during the subsequent conveyance of the tray 2. For this reason, there is no need to form the cam 16 after the locking portion 13g engages with the convex 13f, so that formation of the cam 16 finishes at the end part 16a as shown in FIG. 2. In this manner, length of the cam 16 can be reduced, and abrasion of the axis 13e of the opener 13 can be suppressed.

In this embodiment, the opener 13 is provided on the tray 2, while the opener 13 does not engage with the top plate 4. Furthermore, as mentioned above, since the cam 16 on the mechanical base 1 has no engagement with the axis 13e of the opener 13 after the loading portion 13g engages with the convex 2f, the opener 13 does not engage with the mechanical base 1 as well.

Therefore, a force to stop the shutter 101 in an open state is applied from the tray 2 itself including the opener 13, and the force is applied exclusively by the tray 2 itself. Namely, an external force will not applied by any other elements than the mechanical base 1 and the top plate 4.

On the other hand, for the above-mentioned configuration of arranging in an exclusive space provided on the top plate 4 a system for opening the shutter 101a of a cam or a lever, the force to open the shutter 101a may hinder positioning of the tray 2 on the lift base 3. As a result, the force applied to the tray 2 must be increased at the time of positioning of the tray 2 on the lift base 3, resulting in abrasion or incomplete positioning.

Since no force that will hinder positioning of the tray 2 on the lift base 3 will be applied in this embodiment, positioning of the tray 2 on the lift base 3 can be performed easily and accurately.

(Fifth Embodiment)

Figure 16A:
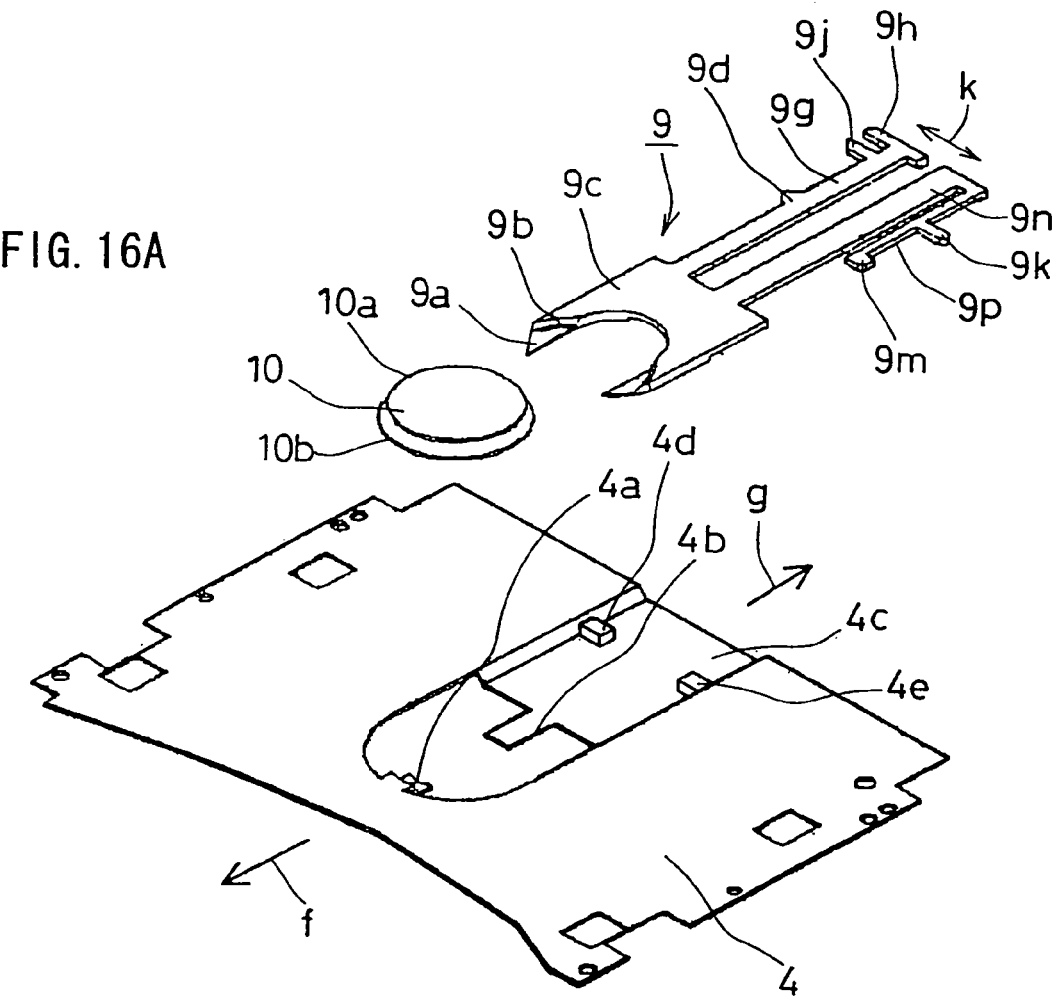
FIG. 16A is an exploded perspective view of a clamper lifting system according to one embodiment of the present invention.
Figures 16B, 16C:
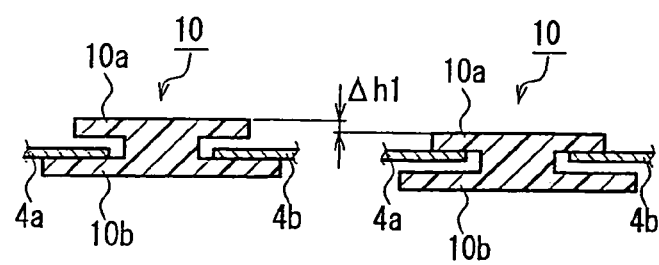
FIG. 16B is a cross-sectional view of a clamper in a raised state according to one embodiment of the present invention.
FIG. 16C is a cross-sectional view of a clamper in a lowered state according to one embodiment of the present invention.

Next, raising/lowering of a clamper will be described below with reference to the attached drawings. FIG. 16A is an exploded perspective view of a lifting system of a clamper. FIGS. 16B and 16C are cross-sectional views for explaining a vertical displacement of the clamper 10. The clamper 10, containing a magnet, can sandwich the bare disk 100 between the motor 6 and the clamper 10 so as to fix the bare disk 100 to the motor 6. On the top plate 4, supporting portions 4a and 4b for supporting the clamper are formed.

A slider 9 as a clamper holder can slide in the longitudinal direction (directions identified with arrows 'f' and 'g') on a recess 4c as a sliding face of the top plate 4. When the slider 9 moves in the 'f' direction, the clamper 10 is raised upward along the tapering portion 9b, and due to this movement, a thick part 9c is inserted between flanges 10a and 10b. FIG. 16B is a cross-sectional view showing a relationship between the clamper 10 and the supporting portions 4a, 4b in this state. In FIG. 16B, the lower faces of the supporting portions 4a, 4b are in contact with the lower flange 10b of the clamper 10.

When the slider 9 moves in the 'g' direction, the thick part 9c leaves the space between the flanges 10a and 10b, while a thin part 9a is inserted between the flanges 10a and 10b. FIG. 16C is a cross-sectional view showing a relationship between the clamper 10 and the supporting portions 4a, 4b. In FIG. 16C, the upper faces of the supporting portions 4a, 4b are in contact with the upper flange 10a of the clamper 10. In this state, the clamper 10 lowers the state in which the thick part 9c is inserted. In comparison between the states shown in FIGS. 16B and 16C, the clamper is positioned higher in FIG. 16B than in FIG. 16C by $\Delta h1$. In this manner, due to the movement of the slider 10 in the 'f' and 'g' directions, the clamper 10 can be raised and lowered.

The slider 9 is interlocked with the conveyance operation of the tray 2 so as to operate. Specific explanation about the operation follows. In the eject state shown in FIG. 1, the slider 9 moves fully in the 'b' direction.

This state corresponds to that in FIG. 16B, and the clamper 10 is pressed upward. In case the tray 2 reached the loading position while the shutter 101a of the cartridge 101 mounted on the tray 2 was in a closed state, the clamper 10 would collide at the lower end against the shutter 101a. However, since the opener 13 slides as described above, the shutter 101a opens to avoid collision with the clamper 10 before the shutter 101a reaches directly below the clamper 10. Therefore, at the loading position, the lower end of the clamper 10 will be positioned within the aperture 101b of the cartridge 101.

In this embodiment, the clamper 10 is arranged in the recess 4c of the top plate 4, and also a system such as a slider 9 is arranged to raise/lower the clamper 10. In addition, the recess 4c of the top plate 4 is arranged within the aperture 101b (FIG. 3C) of the cartridge 101. This system is useful in minimizing springing-up of the elements from the upper surface of the top plate 4, and thus the apparatus can be downsized.

Figure 17A:
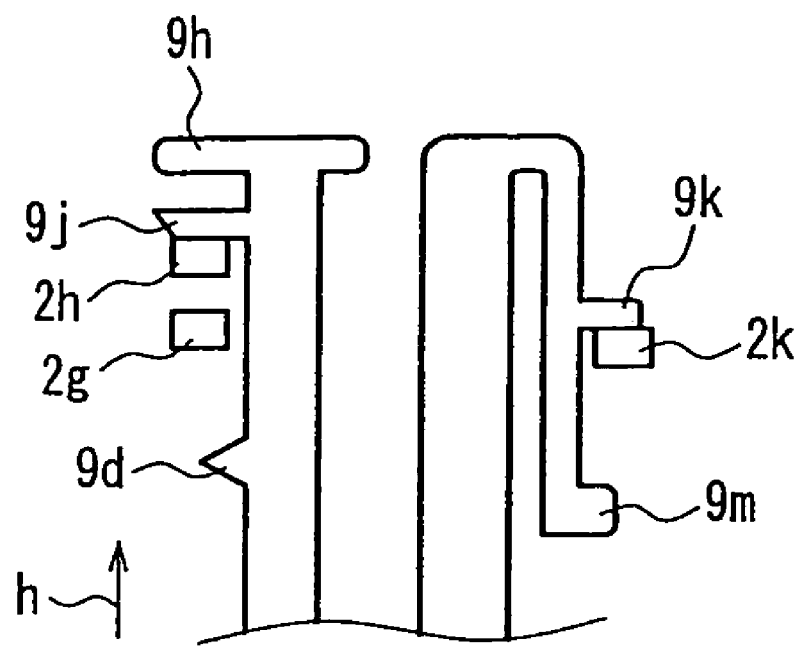
FIG. 17A is a view showing a relationship between a slider and a tray projection according to one embodiment of the present invention.

When the tray 2 is conveyed in the 'c' direction, projections 2h, 2k FIGS. 4 and 13) formed on the tray 2 reach the front of the protruding portions 9j, 9k of the slider 9. FIG. 17A is a plan view of the slider 9 in this state. Subsequently, the tray 2 is conveyed in the 'h' direction while the projections 2h, 2k are pressing the protruding portions 9j, 9k of the slider 9. Thereby, the slider 9 moves in the 'h' direction, sliding on the recess 4c of the top plate 4.

Figure 18:
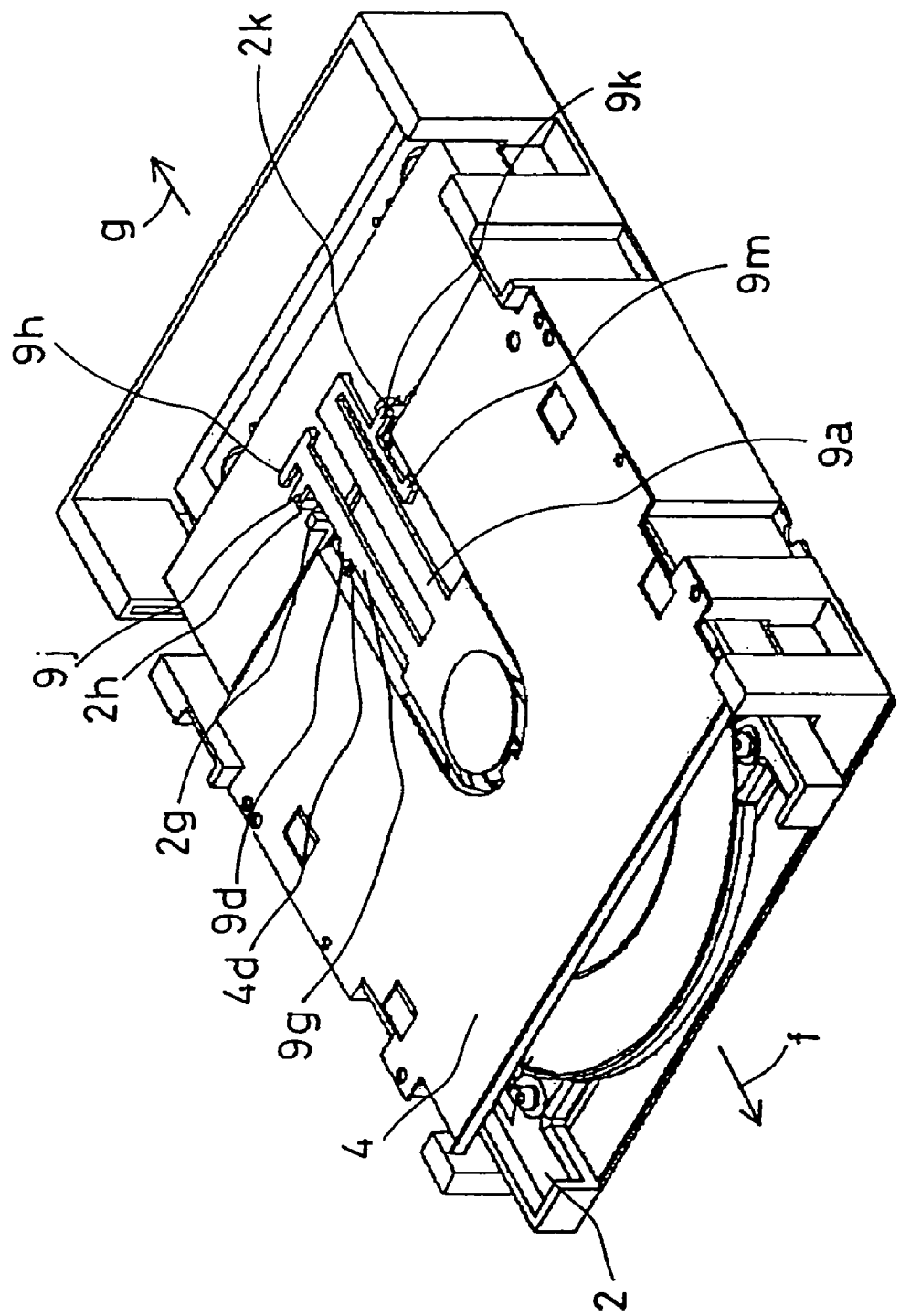
FIG. 18 is a perspective view of a loading device in which a clamper and a thick part of a slider engage with each other according to one embodiment of the present invention.

The slider 9 is made of a resin material. Its slender belts 9g, 9n, 9p can have a spring effect, and they can be bent in a direction identified with an arrow 'k' as a flat face direction. Thereby, as the slider 9 moves further in the 'h' direction, protruding portions 9d, 9m of the slider 9 are contacted respectively with the convexes 4d, 4e of the top plate 4, and thus the protruding portions 9d, 9m pass through the convexes 4d, 4e while the slider 9 is being bent. The convexes 4*d*, 4*e* of the top plate 4 are formed, for example, by press-molding integrally the top plate 4. Alternatively, the convexes 4*d*, 4*e* can be formed by connecting separately. FIG. 18 is a general perspective view of the loading device in a state in which the slider 9 is bent, and a projection 2*g* of the tray 2 is engaging in a space between the protruding portion 9*h* and the protruding portion 9*j*.

Figure 17B:
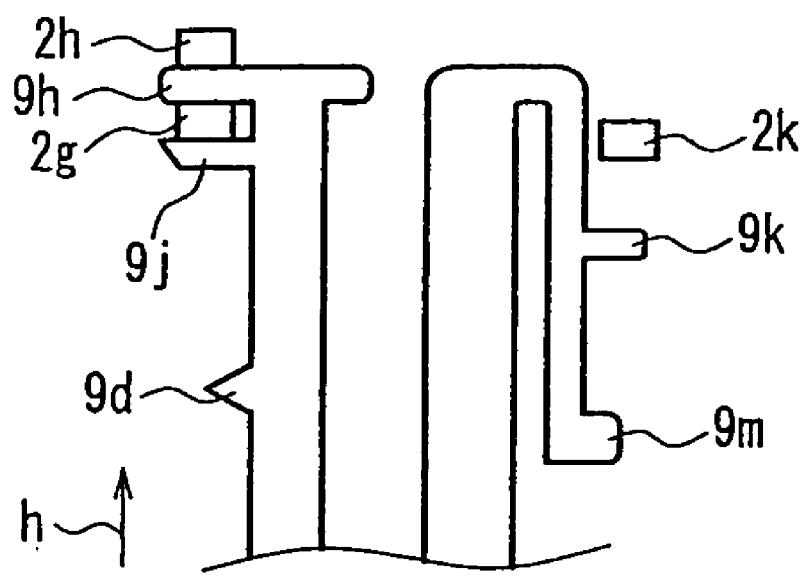
FIG. 17B is a view showing a relationship between a slider and a tray projection in another state according to one embodiment of the present invention.

FIG. 17B is a plan view showing that the protruding portions 9*d*, 9*m* of the slider 9 passing through the convexes 4*d*, 4*e* of the top plate 4. Since the projection 2*g* of the tray 2 engages with the space between the protruding portion 9*h* and the protruding portion 9*j* in this state, the slider 9 will continue to move in the 'h' direction due to the conveyance of the tray 2.

Figure 19:
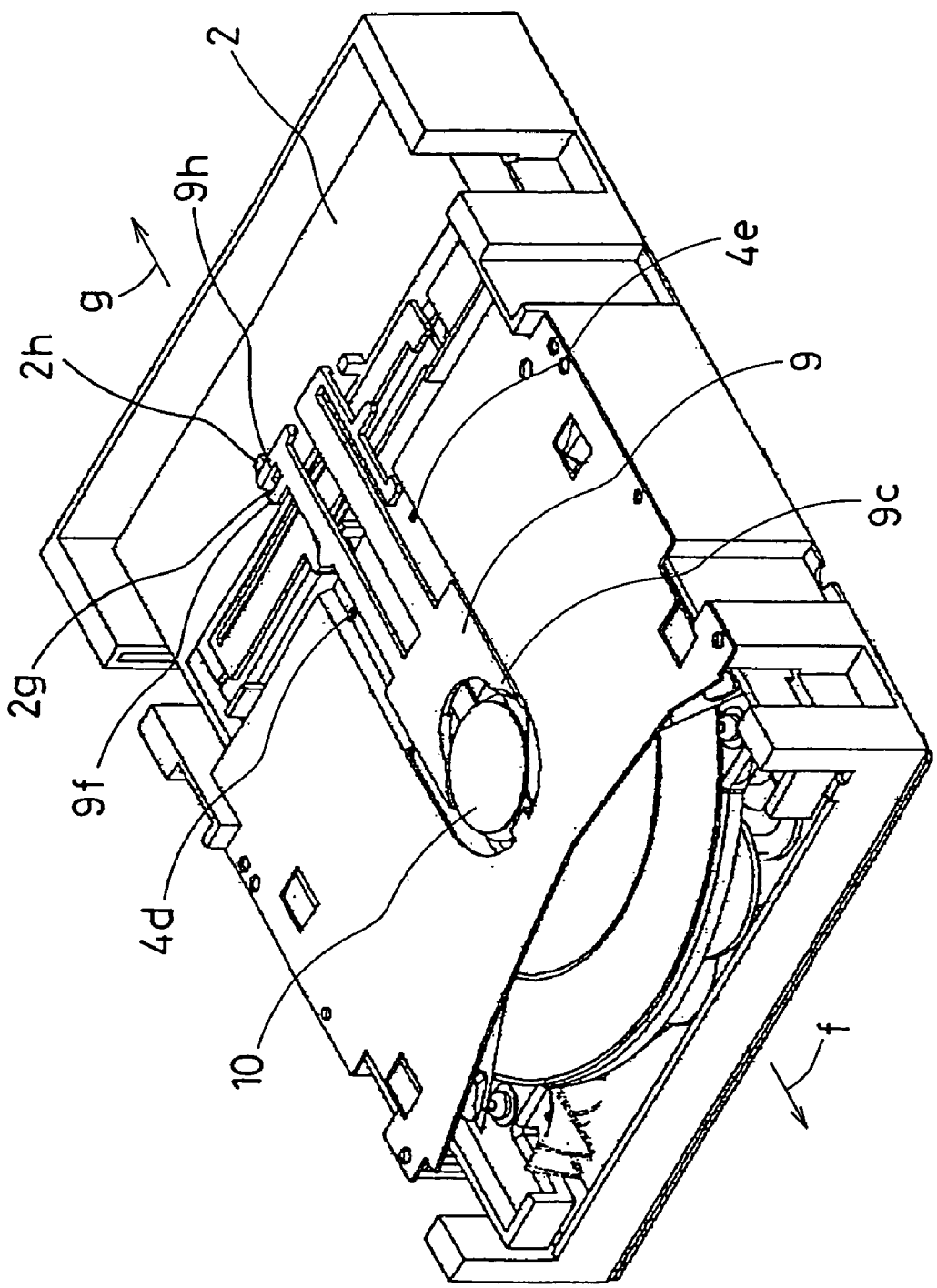
FIG. 19 is a perspective view in which a clamper and a thick part of a slider are disengaged according to one embodiment of the present invention.

FIG. 19 is a general perspective view of a loading device in a state in which the tray 2 has been conveyed to the loading position. In this state, the clamper 10 is disengaged from the thick part 9*c* of the slider 9 as a result of the movement of the slider 9. This state corresponds to that in FIG. 16C, and the clamper 10 lowers so that the disk 100 can be attached to the motor 6. The above-described operations are reversible. The cartridge 101 can be ejected without interfering with the other elements by operating the tray 2 in the 'f' direction.

(Sixth Embodiment)

Figure 20:
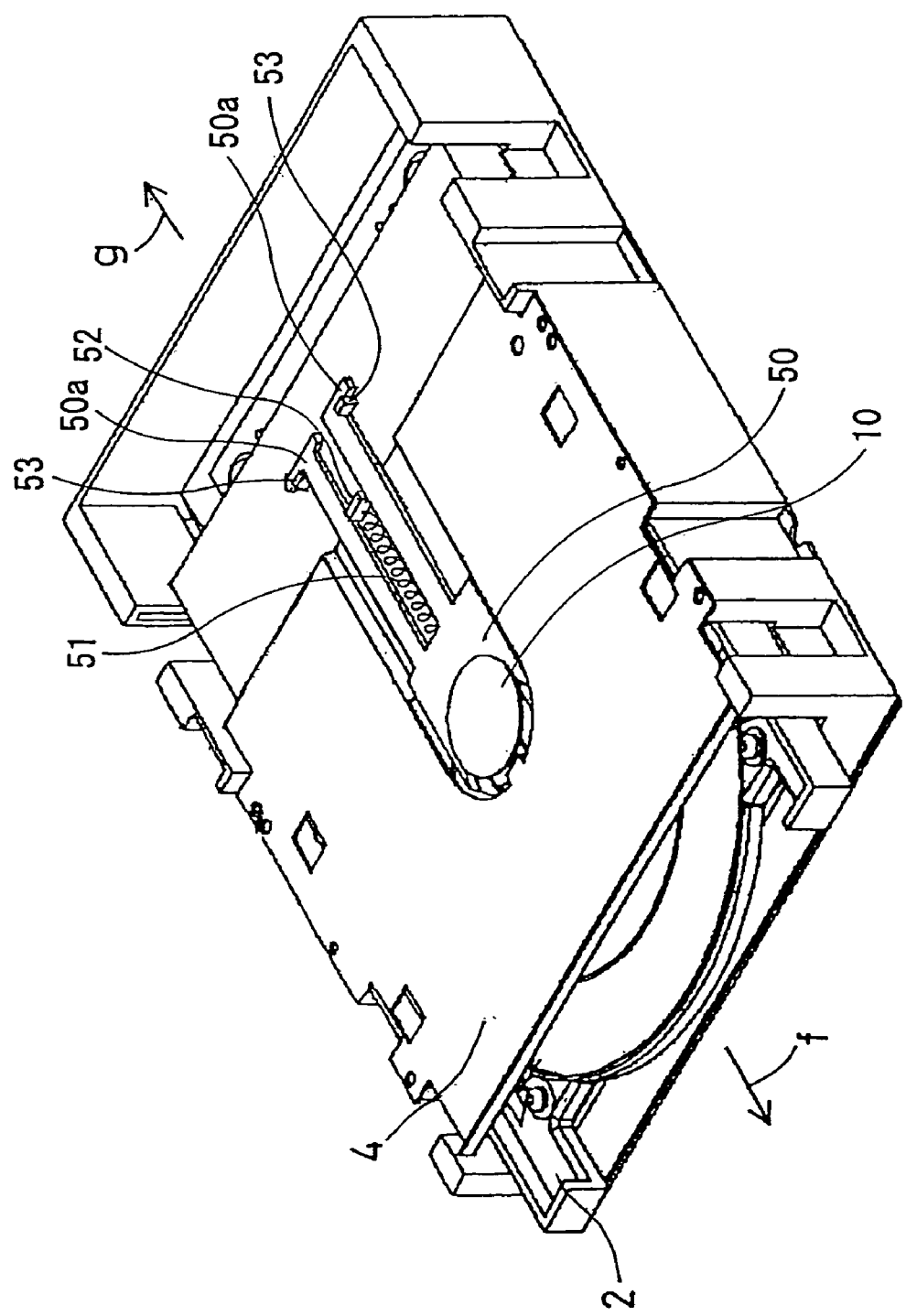
FIG. 20 is a general perspective view of a loading device according to another embodiment of the present invention.

A sixth embodiment relates to a separate sliding system of a clamper. FIG. 20 is a general perspective view of a loading device according to the sixth embodiment. In this embodiment, the structure for sliding a slider 50 as a clamper holder in the longitudinal direction (directions identified with arrows 'f' and 'g') is simplified in comparison with the fifth embodiment. The sixth embodiment is similar to the fifth embodiment for the system of raising/lowering the clamper 10 by engagement and disengagement between the clamper 10 and the slider 50.

To the slider 50, a spring 51 as a stretching member is attached to stretch in the sliding direction of the slider 50 (directions identified with arrows 'f' and 'g'). The spring 51 is fixed at one end to the slider 50, and at the other end to a protrusion 52 formed integrally in the top plate 4. A substantially L-shape bent-back part 50*a* is formed on the slider 50. For corresponding to this bent-back part 50*a*, a convex 53 is formed integrally on the tray 2. The bent-back part 50*a* is arranged behind the convex 53 (opposite to the entrance for the disk).

In the process of loading, when the tray 2 moves in the 'g' direction, the convex 53 integrated with the tray 2 presses the bent-back part 50*a*. Thereby, the slider 50 moves in the 'g' direction while the spring 51 is under compression. As a result, the clamper 10 is disengaged from the slider 50 and lowers to sandwich and attach the disk 100 onto the motor 6.

When the tray 2 moves in the 'f' direction at the time of ejection, the convex 53 cannot press the bent-back part 50*a*. However, the slider 50 moves in the 'f' direction due to a restoring force of the compressed spring 51. As a result of the movement of the slider 50 in the 'f' direction, the slider 50 engages again with the clamper 10, and thus the clamper 10 is separated from the disk. Although this embodiment requires a separate spring 51, it enables simplifying the slider system of the slider 50 and also the operations, thereby stabilizing and securing raising/lowering of the clamper.

(Seventh Embodiment)

Figure 21:
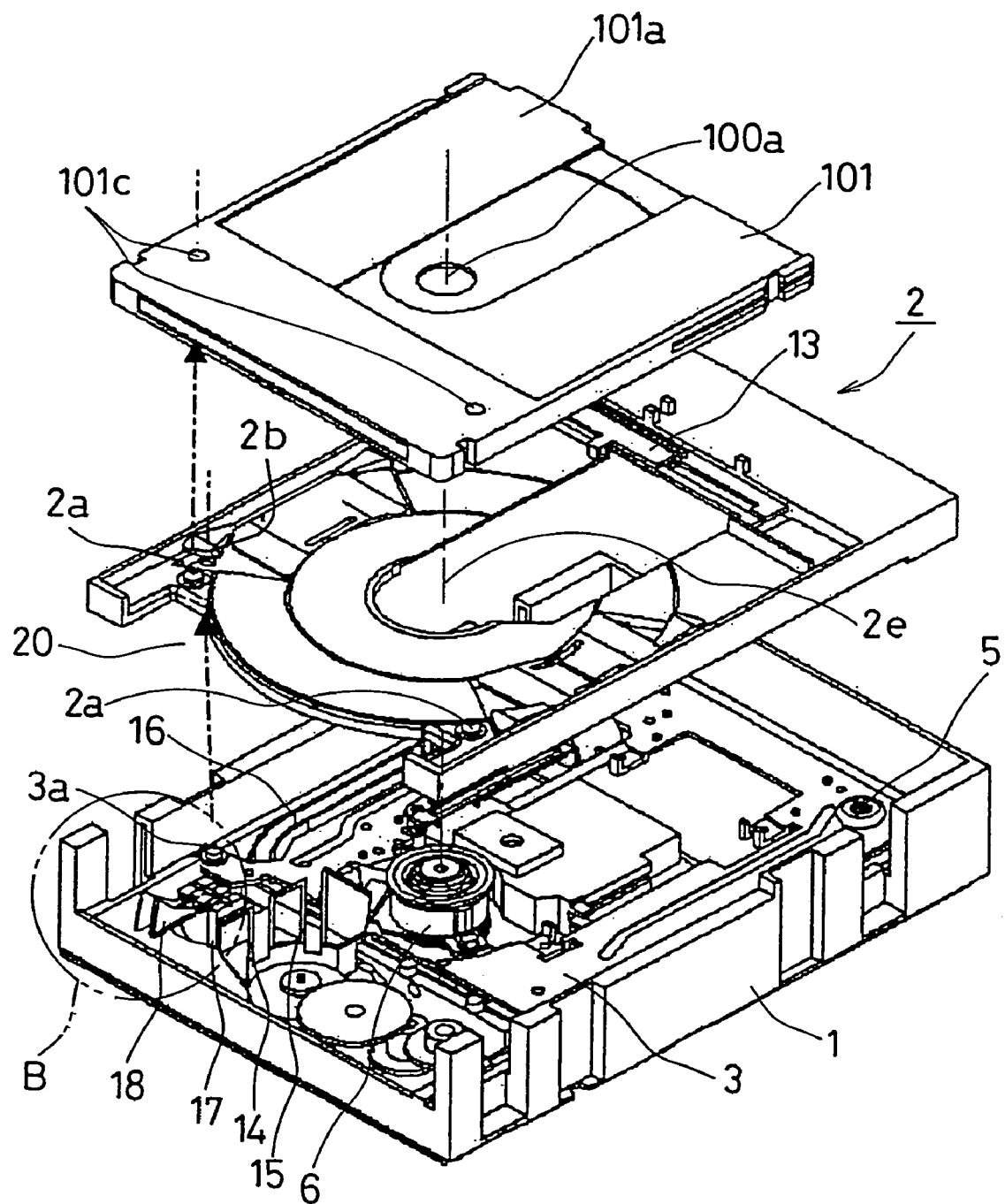
FIG. 21 is an exploded perspective view showing a relationship between a cartridge and a loading device according to another embodiment of the present invention.

A seventh embodiment relates to positioning of a disk. The following explanation with reference to FIGS. 21–23 relates to a process in which a tray 2 moves to a loading position and then the disk 100 is mounted on the motor 6. FIG. 21 is a schematic perspective view showing a relationship between the mechanical base 1, a tray 2, and a cartridge 101 at the loading position.

Approaching the loading position, the tray 2 is disengaged from driving elements such as a gear. As a result, the tray 2 engages with a cam for substantially positioning the tray 2, and the lift base 3 begins to rise. Since these operations are conventionally well known, explanations with reference to drawings will be omitted.

In FIG. 21, the cartridge 101 and the tray 2 are illustrated separately. At the loading position, the bosses 2*a* of the tray 2 are inserted into the holes 101*c* of the cartridge 101, and thus the cartridge 101 is positioned on the tray 2. In addition, by inserting the boss 3*a* of the lift base 3 into the hole 2*b* formed on the tray 2, the tray 2 is positioned on the lift base 3. As a result, the cartridge 101 is positioned on the lift base 3, and thus the center 100*a* of the bare disk 100, the center 2*e* of the tray 2, and the rotation center of the motor 6 match each other.

As shown in FIG. 21, a switch 17 and a lever 18 connected to the switch 17 are attached to the mechanical base 1. A notch 20 is formed in the front of the tray 2. At the loading position, the lever 18 is positioned corresponding to the position of the notch 21.

The positioning operations are specified below by referring to FIG. 22 for comparison with a comparative example. FIG. 22A–22C show positioning operations of an apparatus according to the comparative example. FIGS. 22D–22F show positioning operations of an apparatus according to the present invention. FIG. 22A shows the tray 30 is positioned in front of the loading position but fully separated from the loading position. For the comparative example shown in the drawings, a switch 33 and a boss 31*a* are arranged on the lift base 31 with a motor 32 mounted thereon. In FIG. 22A, the lift base 31 lowers. When the tray 30 proceeds in the direction identified with an arrow and reaches the vicinity of the loading position, the lift base 31 will rise.

In FIG. 22B, the tray 30 has proceeded to some degree. In FIG. 22C, the tray 30 reaches the loading position. In FIG. 22C, the lift base 31 rises, the boss 31*a* passes through the hole 30*a* of the tray 30 so as to be inserted into the hole of the cartridge 101. In FIG. 22C, the cartridge 101 is positioned on the lift base 30 and a tip of the switch 33 engages with the recess of the cartridge 101, thereby allowing the determination of the kind of the cartridge 101 by detecting the displacement amount of the tip of the switch 33.

Figure 23A:
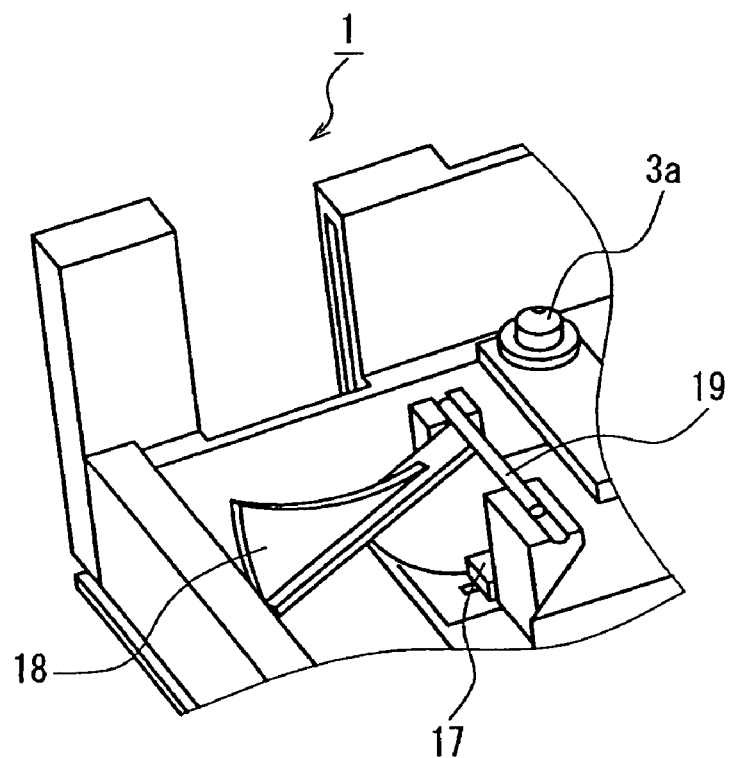
FIG. 23A is a perspective view of a switching portion in a tray conveyance according to one embodiment of the present invention.

In FIG. 22D according to the present invention, the tray 2 is positioned in front of the loading position, though fully separated. The basic structure is as described in FIG. 21. In FIG. 22D, the lever 18 is pressed by the tray 2. FIG. 23A is an exploded view for showing this state, and it corresponds to an exploded view of the part 'B' in FIG. 21. The lever 18 is pressed by the tray 2, lowering rotationally about the rotation axis 19 and embedded on the bottom face of the mechanical base 1. The rotation axis 19 is illustrated visually for the sake of clarity.

In FIG. 22E, the tray 2 proceeds further. In this state, the lever 18 is provided for the notch 20 (see FIG. 21) of the tray 2. Since the pressure on the lever 18 is released, the lever 18 rises to a position corresponding to the recess on the cartridge 101. In this case, the kind of the cartridge 101 can be discriminated by detecting the displacement amount of the lever 18.

In FIG. 22F, the tray 2 reaches the loading position. At the loading position, the boss 2*a* of the tray 2 is inserted into the hole 101*c* of the cartridge 101 (FIG. 3), thereby providing a first positioning for the cartridge 101 on the tray 2. Similarly, a second positioning for the tray 2 on the lift base 3 is provided by inserting the boss 3a of the lift base 3 into the hole 2b formed on the tray 2. As a result of this two-step positioning, the cartridge 101 is positioned on the lift base 3, and thus the center 100a of the bare disk 100, the center 2e of the tray 2, and the rotation center of the motor 6 match each other.

This embodiment aims to decease thickness of the loading system by this two-step positioning. In this embodiment, the boss 3a of the lift base 3 is used not for positioning directly with the hole of the cartridge 101 but for positioning with the tray 2. Therefore, the boss 31a of the lift base 3 can be positioned more backward (rear) in comparison with the configuration of the comparative example, i.e., the boss 31a of the lift base 31 is positioned directly with the hole of the cartridge 101. Furthermore, the switching system according to the embodiment is not mounted on the lift base 3 but loaded on the mechanical base 1.

Thereby, the position of the positioning boss 3a can be set at the end of the lift base 3. As a result, the whole length of the lift base 31 according to this embodiment can be set shorter than that in conventional techniques. Thereby, as shown in FIG. 22B, the thickness of the loading system can be decreased by the height 'h' even if the rotation angle for raising the lift base 3 is the same as that in the comparative example.

(Eighth Embodiment)

An eighth embodiment relates to an apparatus that can record and reproduce plural kinds of bare disks different from each other in the outer diameter. While the first embodiment refers to a configuration for vertically placing bare disks, the eighth embodiment relates to a configuration for vertically placing bare disks smaller in diameter. This embodiment is same as the first embodiment for the raising/lowering of the lift base and of the clamper. Therefore, components common to those in the first embodiment are numbered identically, and the detailed explanation will be omitted.

Figure 24:
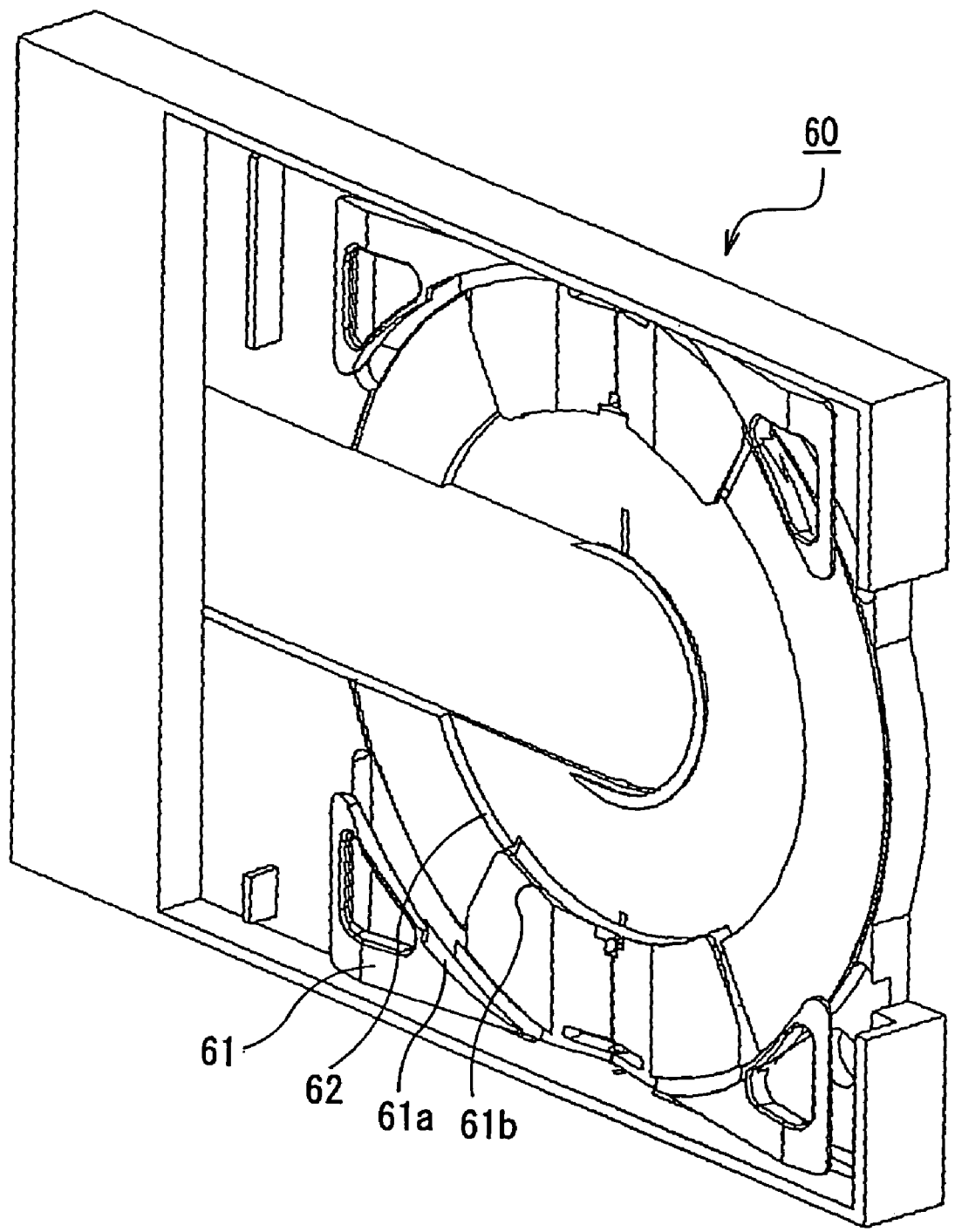
FIG. 24 is a perspective view of a tray according to another embodiment of the present invention.

FIG. 24 is a perspective view of a tray 60 according to this embodiment. In this perspective view, a bare disk is not mounted. Disk guides as disk position controllers are attached to the tray 60. One disk guide is composed of a pair of disk guides. A set of disk guides 61 is arranged on each side face of the tray 60.

As mentioned below, the disk guide 61 is shaped for vertically placing a bare disk with a small diameter, while its basic system and operations area similar to those of the disk guide 8 described in the previous embodiment.

The tray 60 shown in the drawing can be used to mount a large bare disk e.g., 120 mm in diameter, and also a small bare disk that is e.g., 80 mm in diameter. It has a wall face 61a with which a peripheral face of a large bare disk will be contacted when vertically placing the tray 60. It has also a wall face 62 with which a peripheral face of a small bare disk will be contacted, and which is formed by stepping the main surface of the tray 60.

Figure 25:
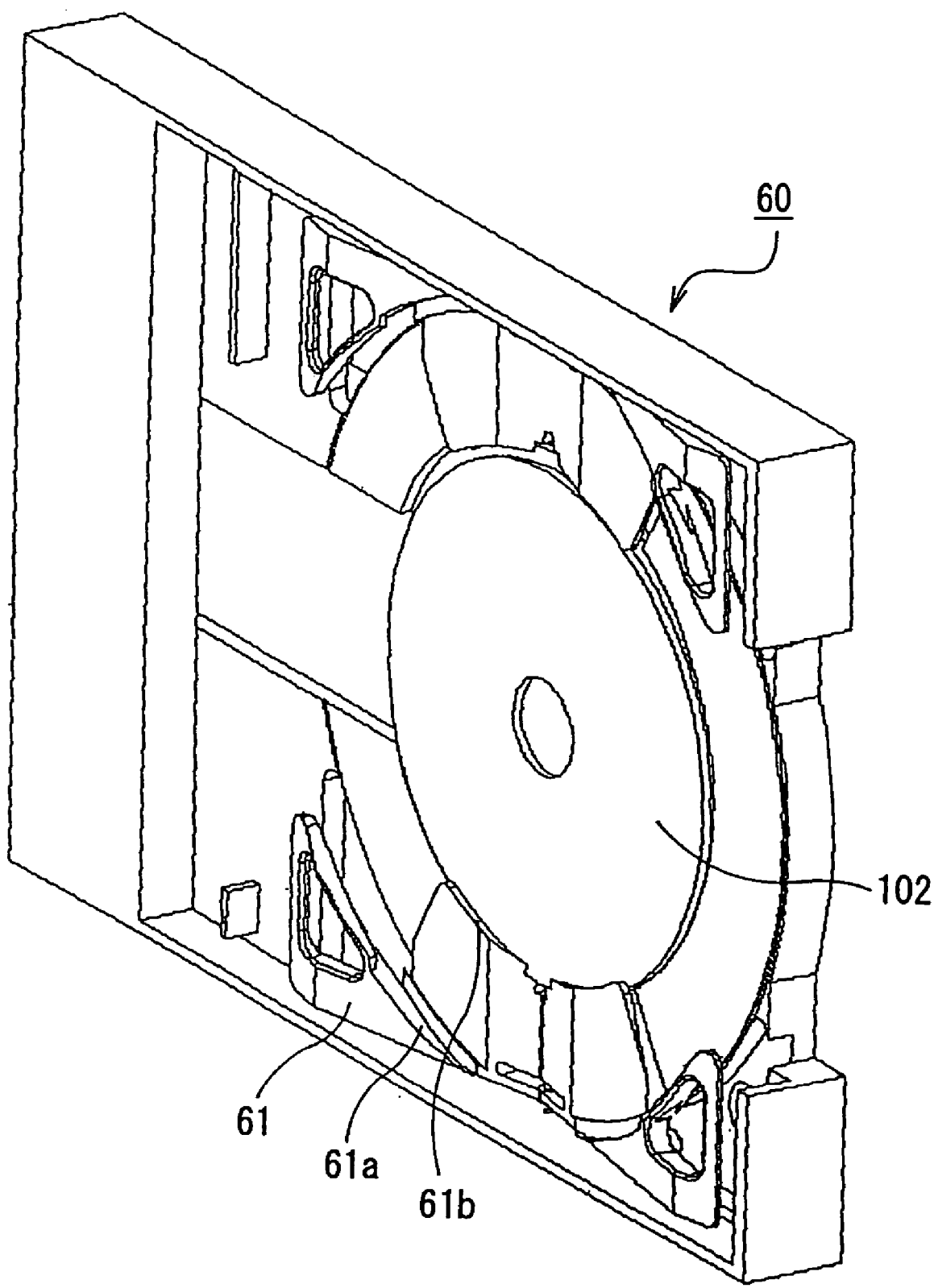
FIG. 25 is a perspective view of a small diameter bare disk in a vertically-placed state according to one embodiment of the present invention.

FIG. 25 is a perspective view in which a small bare disk 102 is placed vertically. In this drawing, the peripheral face of the bare disk 102 is contacted with the wall face 62 due to its own weight. An internal circumferential side face 61b of the bare disk 102 extends inwards in comparison with the wall face 62 (toward the center of the bare disk 102). Therefore, a part of the surface of the bare disk 102 is mounted on the wall face 62, and a part of the peripheral face of the bare disk 102 overlaps with the disk guide 61. This configuration serves to prevent the bare disk 102 from failing to keep its vertically-held state and disengaging from the tray 60. As shown in FIG. 25, the loading proceeds in a state in which the bare disk 102 is mounted, and thus the tray 60 moves toward the mechanical base (FIG. 1).

Hereinafter, FIGS. 26A–26C are referred to for explanation about the operations of the tray 60 subsequent to its move to the interior of the mechanical base. FIG. 26A is a cross-sectional view showing the tray 60 housed in the mechanical base. With the proceeding of the tray 60 within the mechanical base 60, the lift base 3 is displaced toward the bare disk 102. In FIG. 26A, a center cone 6b of the motor 6 is disposed adjacent to the bare disk 102.

The positional relationship between the tray 60 and the bare disk 102 in FIG. 26A is same as that in FIG. 25. A part of the peripheral face of the bare disk 102 is mounted on the wall face 62. Since a part of the surface of the bare disk 102 is overlaps with the disk guide 61 in this state, the bare disk 102 will be mounted on the tray 60 without any substantial risk of falling. Furthermore, since the bare disk 102 is mounted on the wall face 62 while being applied with its own weight, the center axis 102b of the bare disk 102 is displaced downward by $\Delta r$ with respect to the rotation axis 6a of the motor 6.

Figure 27:
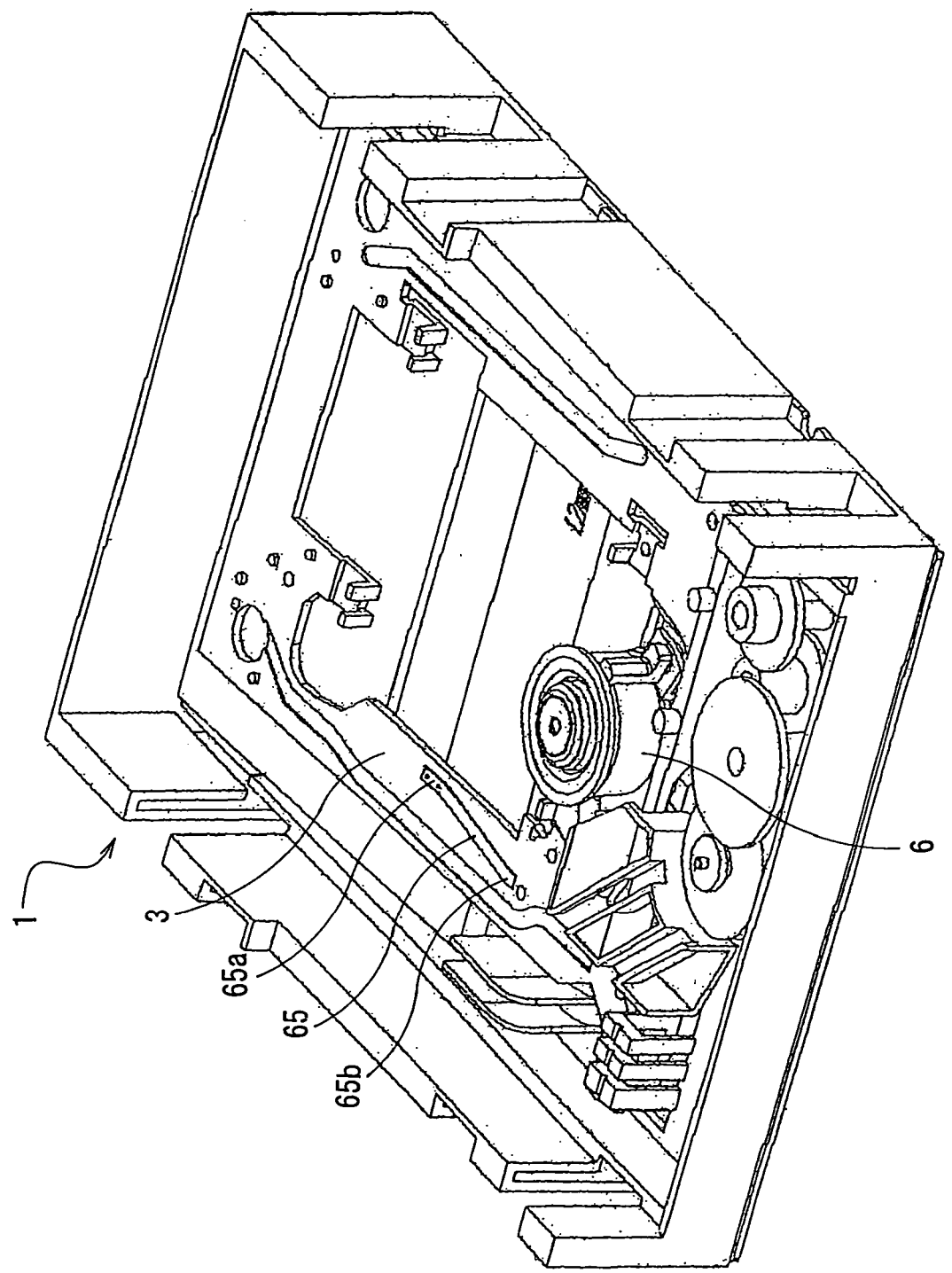
FIG. 27 is a cross-sectional view of a mechanical base according to one embodiment of the present invention.

Next, a position correction system of the bare disk 102 will be explained. To the lift base 3, a plate spring 65 as a biasing member is fixed. FIG. 27 is a perspective view of the mechanical base 1 and it includes a general view of the plate spring 65. The plate spring 65 is fixed at one end 65a to the lift base 3, while the other end 65b floats above the main face of the lift base 3.

As shown in FIG. 26A, a correction lever 63 is attached to the tray 50, and the correction lever can rotate about the rotation axis 64. In FIG. 26A, the tip 65b of the plate spring 65 and the correction lever 63 are positioned to correspond to each other. With the lift base 3 being displaced to approach the bare disk 102, the plate spring 65 presses the correction lever 63 to rotate. That is, the plate spring 65 presses the correction lever 63 so as to shorten the distance to the tray 60 on one hand, the plate spring 65 presses the correction lever 63 on the other hand due to the resilience generated simultaneously. As a result of the rotation of the correction lever 63, the bare disk 102 is pressed upward.

In FIG. 26B, the position of the bare disk 102 has been corrected by the rotation of the correction lever 63, and thus the position of the center axis 102b of the bare disk 102 matches with the position of the rotation axis 6a of the motor 6. Since the bare disk 102 rises further in comparison with the case of FIG. 26A, the surface of the bare disk 102 does not overlap with the disk guide 61. At this time, however, the clamper 10 containing a magnet lowers to the position of the bare disk 102. That is, an attraction force acts between the clamper 10 and the motor 6, and moreover, the center cone 6b of the motor 6 is positioned to be inserted into a hole formed at the center of the bare disk 102. Due to this configuration, the bare disk 102 will not be disengaged from the tray 60.

Figure 28:
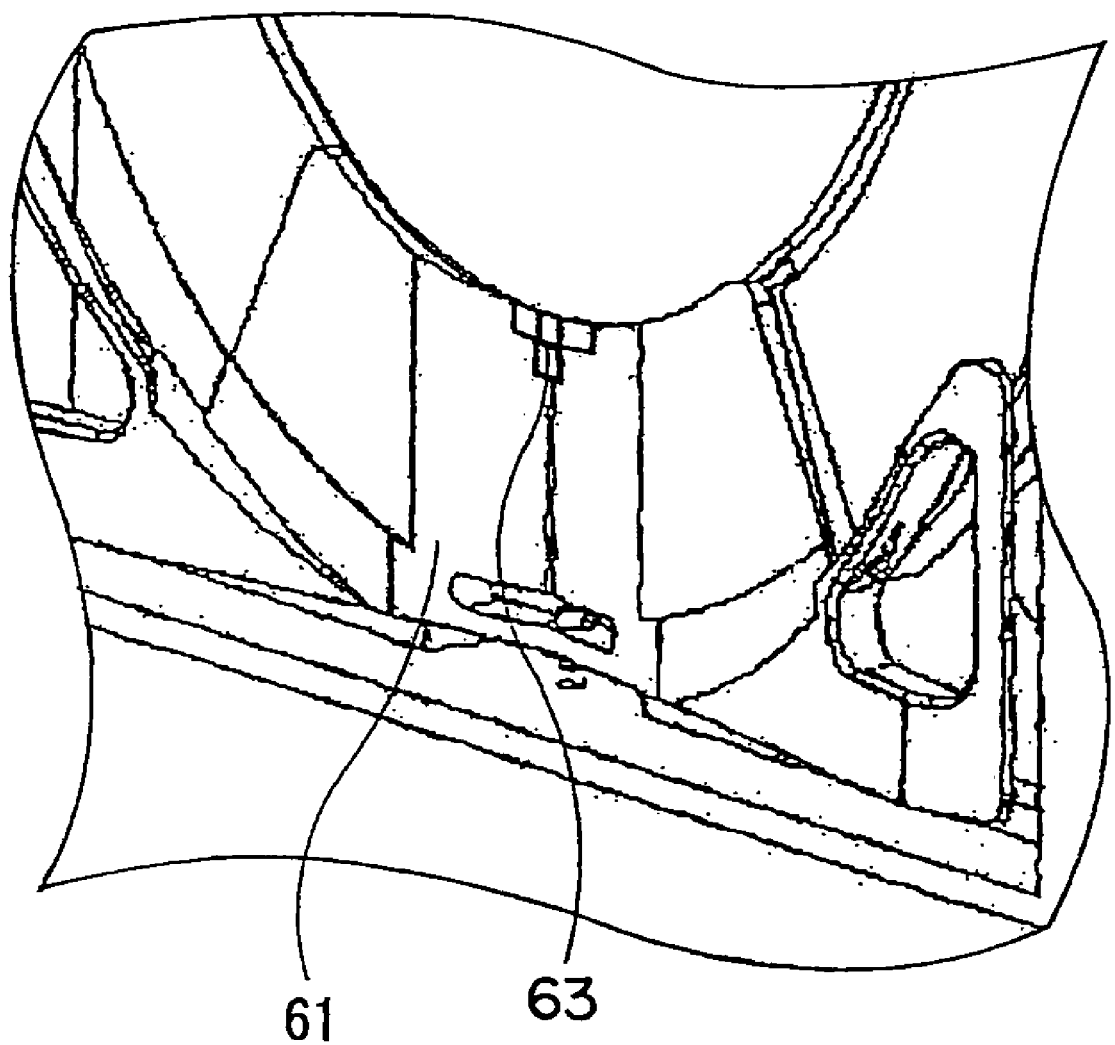
FIG. 28 is a cross-sectional view of a correction lever according to one embodiment of the present invention.

FIG. 28 is an exploded view of a part in the vicinity the correction lever 63 in the state of FIG. 26B. The correction lever 63 is positioned at the notch of the disk guide 61, pressing the peripheral side face of the bare disk 102.

FIG. 26C is a cross-sectional view showing that the lift base 3 rises further in comparison with the state in FIG. 26B and that the bare disk 102 is in a loading state. The hole at the center of the bare disk 102 engages with the center cone 6b of the motor 6, and thus the bare disk 102 engages with a turn table 6c. Thereby, the bare disk 102 is held due to an attraction force generated between the motor 6 and the magnet-containing clamper 10. In this state, the bare disk 102 can be rotated for recording and reproduction.

The above description is about the configuration for vertical placing of a small bare disk 102. In this embodiment, the basic system and operations of the disk guide 61 are substantially the same as those of the disk guide 8 described in the previous embodiment. Similar to the previous cases, a large bare disk can be placed vertically for loading. In this case, there will be no objects to be pressed by the correction lever 63. However, there is no substantial difference from the case of vertically placing a small bare disk when considering the correction lever 63 rotates due to the displacement as the lift base 3 approaches the bare disk 102.

In this embodiment, the position and the shape of the correction lever 63 are adjusted so that the correction lever 63 will not push a large bare disk out even when the correction lever 63 rotates. When the loading is completed as shown in FIG. 26C, resilience of the compressed plate spring 65 is applied to the correction lever 63. However, since the correction lever 63 is contacted with the tray 60 so as to stop the rotation and the movement, further rotation will not occur in comparison with the state of FIG. 26C.

Without being limited to the vertical placing of the small bare disk 102, the disk can be placed horizontally for loading. In such a case, as mentioned in the first embodiment, the disk guide 61 is located at the first position (FIG. 7B) where it is locked by a locking system and limited in its upward displacement.

In this case, the position of the internal circumferential side face 61b of the disk guide 61 will match substantially with the position of the peripheral face of the bare disk 102 in the vertical direction. Thereby, the position of the bare disk 102 in the main face direction will be restricted by the internal circumferential side face 61b of the disk guide 61. In this configuration, as shown in FIG. 25, the part of the main face of the bare disk 102 will not overlap with the disk guide 61. Accordingly, in a case of placing the bare disk 102 horizontally, it is possible to prevent the bare disk 102 from slipping below the disk guide 61 and making it difficult to take out the bare disk 102.

This embodiment refers to an example of recording and reproducing two kinds of bare disks different from each other in the outer diameter. The configuration can correspond to bare disks of three kinds or more different in the outer diameter. For example, between the wall faces 62 and 61a, the disk guide 61 is provided with a sidewall (a sidewall with which the disk outer peripheral face will be in contact by its own weight) corresponding to the wall face 62, and an extending portion (a part overlapping with a part of the disk and prevents dropping of the disk) corresponding to the vicinity of the wall face 61b, and further adding structures corresponding to the correction lever 63 and the plate spring 65, so as to correspond to three kinds of bare disks different in the outer diameter.

A sidewall to be newly added can be formed, for example, as a step formed on the disk guide 61. An extending portion to be newly added can be formed integrally with the step on a part extending toward the center of the disk with respect to the step. By adding the structures in this manner, it is possible to correspond to four or more kinds of bare disks different in the outer diameter.

(Ninth Embodiment)

Figure 23B:
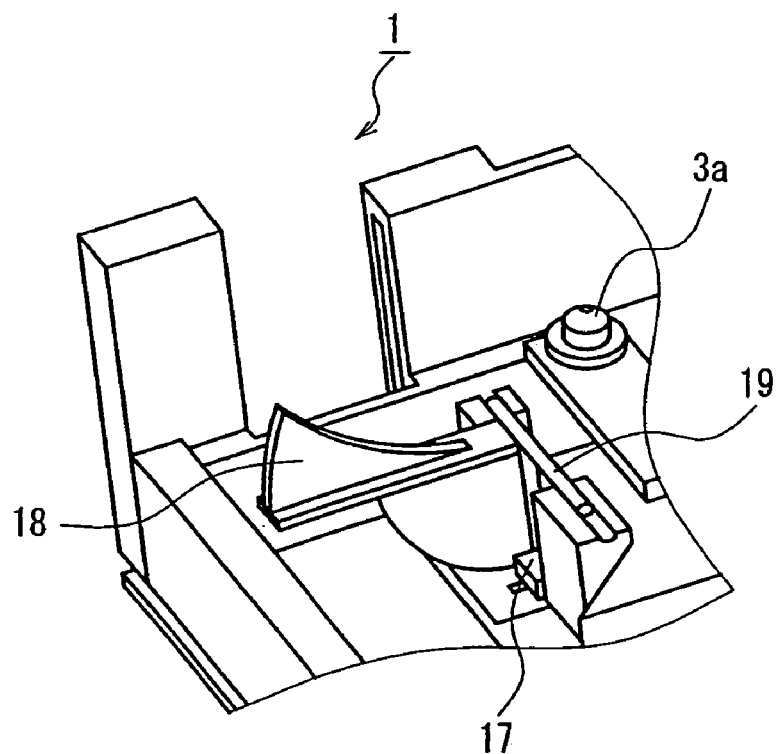
FIG. 23B is a perspective view of a switching member at a loading position according to one embodiment of the present invention.
Figure 29A:
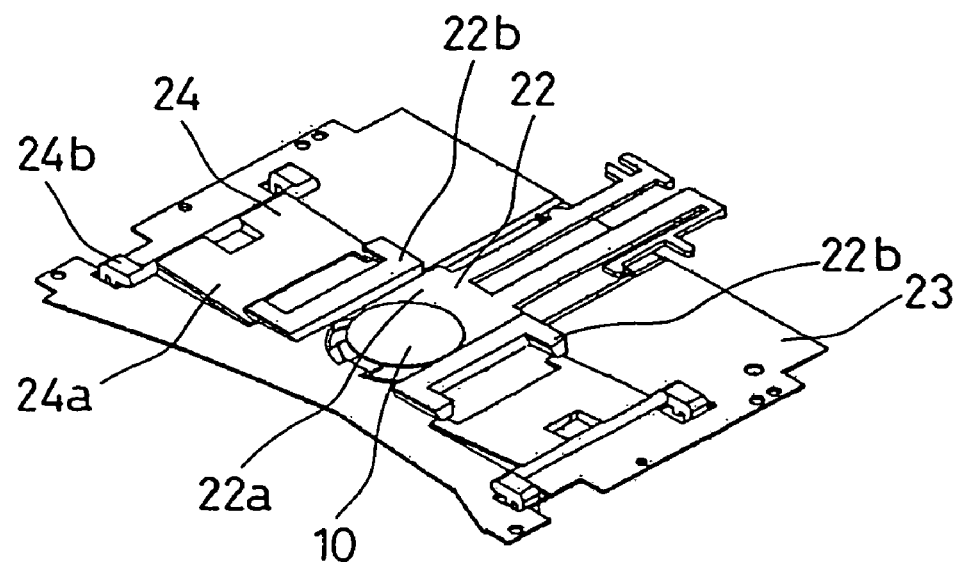
FIG. 29A is a cross-sectional view showing a pressing system before completion of loading according to one embodiment of the present invention.
Figure 29B:
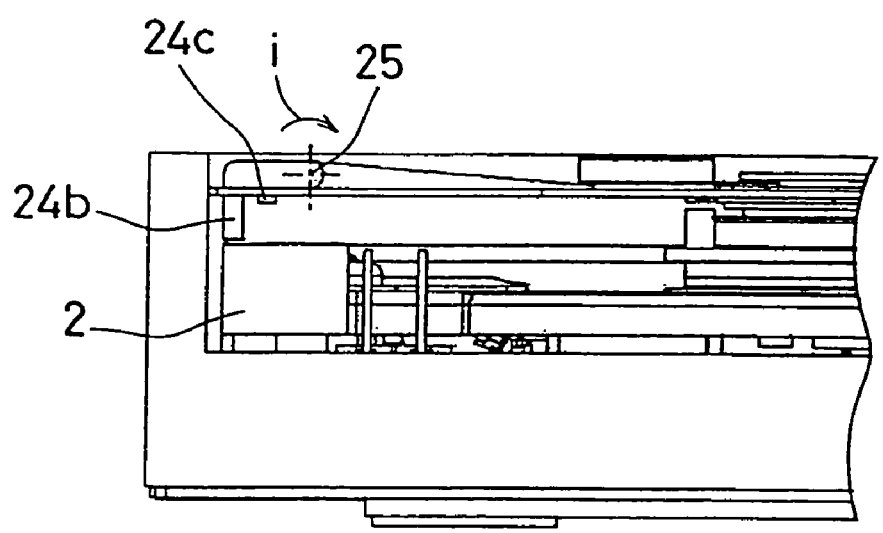
FIG. 29B is a view showing the tray being pressed in the state of FIG. 29A.

A ninth embodiment relates to a pressing means. FIGS. 29 and 30 show pressing operations. FIG. 23 shows a disk in conveyance before completion of loading. FIG. 24 shows a disk in conveyance after completion of loading. FIG. 29A is a perspective view showing a relationship between a top plate 23 and a slider 22 as a clamper holder. Though the slider 22 is substantially the same as the above-mentioned slider 9 in the basic configuration and actions, unlike the slider 9, the slider 22 has engaging portions 22b as engaging means formed integrally on the both sides of the thick part 22a. Furthermore, pressing levers 24 are attached to the both sides of the top plate 23. Each pressing element 24 comprises a plate 24a and a pressing portion 24b formed integrally, and it is rotatable about a rotation center 25.

A compression spring 26 (FIG. 30B) is arranged between the bottom face of the plate 24a and the top plate 4. In the state of FIG. 30B, i.e., subsequent to the completion of loading, the pressing lever 24 is in an unloaded state, and resilience of the compression spring 26 is applied to the pressing lever 24 so as to rotate in a direction identified with an arrow 'j'.

The following is specific description about operations to completion of loading. In FIG. 29A, a part of a thick part 22a of the slider 22 is inserted into the gap between the upper and lower flanges of the clamper 10. FIG. 29A corresponds to FIG. 16B, and the clamper 10 is raised upward. In this state, the engaging portion 22b presses the plate 24a.

That is, the engaging portion 22b applies a force (a force to rotate in the 'i' direction) in a direction to compress the compression spring 26, against the resilience of the compression spring 26. In this state, the pressing member 24b is displaced upwards, and thus the pressing portion 24b does not press the tray 2.

Figure 30A:
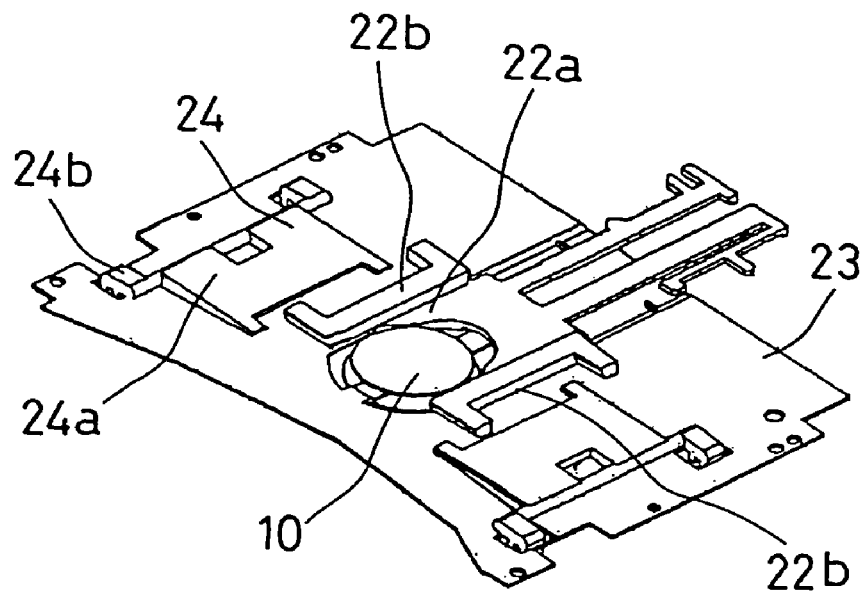
FIG. 30A is a perspective view showing a pressing system after completion of loading according to one embodiment of the present invention.
Figure 30B:
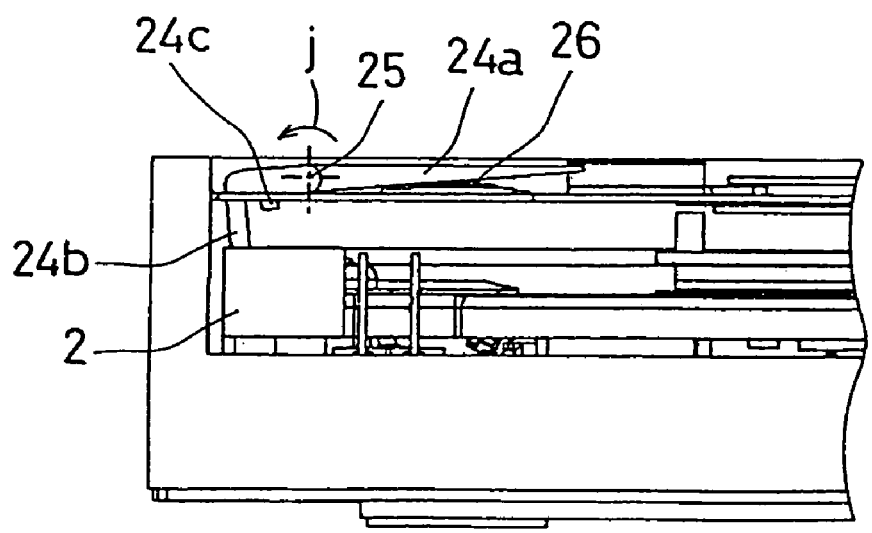
FIG. 30B is a view showing the tray being pressed in the state of FIG. 30A.

FIGS. 30A and 30B show a state in which the loading is completed. FIG. 30A is a perspective view showing a relationship between the top plate 23 and the slider 22. In this drawing, the engagement between the thick part 22a of the slider 22 and the gap of the upper and lower flanges of the clamper 10 is released. FIG. 30A corresponds to FIG. 16C, and the clamper 10 lowers. In this state, the engagement of the engaging portion 22b with the plate 24a is also released.

Thereby, the pressing lever 24 is in an unloaded state. The pressing lever 24 is applied with resilience of the compression spring 26 in a direction for rotating in the 'j' direction, and thus the tray 2 is pressed by the pressing portion 24b. In this state, as described in detailed below, the tray 2 is mounted on the lift base 3, and thus the tray 2 is held between the lift base 3 and the top plate 23 via the pressing element 24 and the compression spring 26.

The above description refers to an example of mounting a bare disk on the tray 2. When mounting a cartridge on the tray 2 as shown in FIG. 30B, the tray 2 is pressed by the pressing portion 24b, and the pressing portion 24b integrated into the plate 24a presses the cartridge. Therefore, the cartridge will be held securely on the tray 2.

(Tenth Embodiment)

When the tray is being pressed as shown in FIG. 30B, the tray 2 is disengaged from the mechanical base 1. An object of this embodiment is downsizing of the entire apparatus by using this configuration. Specific explanation will follow by referring to FIGS. 31A–31D. FIGS. 31A–31D is a schematic view showing main components of the apparatus. A comparative example will be explained first by referring to FIGS. 31C and 31D.

FIG. 31C shows a state before completion of loading. A tray 42 is moving in the 'k' direction. During this movement, the bottom face of the tray 42 slides on a rail 45 formed on the inner wall face of a mechanical base 40. On the mechanical base 40, a lift base 41 and the tray 42 are loaded. FIG. 31D shows a state after completion of loading. The mechanical base 40 is attached to a case 43 via a clamper 44. Thereby, external shock the mechanical base 4 receives is clamped by the clamper 44 and absorbed. In this configuration, a buffer space is necessary between the outer wall of the mechanical base 40 and the inner wall of the case 43, and thereby the apparatus will be upsized.

Next, this embodiment will be described below by referring to FIGS. 31A and 31B. The configurations in FIGS. 31A and 31B as schematic views are not different particularly from those in the previous embodiments. FIG. 21 can be referred to for the internal configuration of the mechanical base 1 and the configuration of the tray 2, and FIGS. 29 and 30 can be referred to for the configurations of the top plate 23. For this reason, the marks of the respective components are common to those in the drawings for the previous embodiments.

FIG. 31A shows a state before completion of loading. The tray 2 is moving in the 'k' direction, and during this movement, the bottom face of the tray 2 slides on the rail 27 as a part-to-be-engaged formed on the inner wall face of the mechanical base 1. Here, the rail 27 has a recess 27b positioned below with respect to the standard face 27a and a convex 27c positioned above with respect to the standard face 27a. The bottom face of the tray 2 has a convex 2n positioned below with respect to the standard face 2m and a recess 2p positioned above with respect to the standard face 2m.

In FIG. 31A, the convex 2n of the tray 2 slides on the standard face 27a of the rail 27, and the standard face 2m of the bottom face of the tray 2 slides on the convex 27c of the rail 27, so that the tray 2 is moving in the 'k' direction.

FIG. 31B shows a state in which the loading is completed. In this state, the convex 2n of the tray 2 is disengaged from the standard face 27a of the rail 27, and similarly, the standard face 2m of the tray 2 is disengaged from the convex 27c of the rail 27. Thereby, the tray 2 is disengaged from the rail, so that it is mounted on the lift base 3, and also held via the compression spring 26 on the top plate 23 integrated with the mechanical base 1.

Here, the lift base 3 is attached to the mechanical base 1 via a clamper 5 as a means for clamping shock and oscillation, and the tray 2 is integrated with the lift base 3. Therefore, external shock will be applied simultaneously to the tray 2 and the lift base 1, and clamped at the clamper 5. On the other hand, since the tray 2 is held onto the top plate 23 via the pressing element 24 and the compression spring 26 as described above, the compression spring 26 acts to absorb the external shock.

In a configuration of providing to the exterior of the tray 2 a system such as a lever or a cam for allowing the shutter 101a to be in an open state, the mechanical base will be subjected to a large force to close the shutter 101a. For this reason, it has been impossible to configure an element to provide a buffer effect between the mechanical base and a cartridge. In this embodiment, a force to stop the shutter 101a in an open state is applied by the tray 2 itself including the opener 13, and the force is applied by the tray 2 exclusively as mentioned in the fourth embodiment. Therefore, in this embodiment, an element for obtaining a buffer effect can be provided inside the mechanical base 1.

As described above, since external shock can be clamped inside the mechanical base 1 according to the present invention, there is no need for providing a separate buffer space on the periphery of the mechanical base 1, resulting in downsizing of the apparatus.

Any disks can be used in this embodiment as long as the disks have central holes. The examples include DVD-RAM, DVD-RW, DVD-VIDEO, DVD-R, CD-AUDIO, CD-ROM, CD-R, CD-RW, PD, MO, and MD. A cartridge not housing a disk is acceptable. For example, a disk housed in a DVD-RAM cartridge can be eliminated.

As described above, an apparatus according to the present invention can be downsized by effectively using spaces inside the apparatus. The apparatus can be downsized also by a configuration for clamping external shock inside the mechanical base.

Since a disk guide of the present invention will not protrude at the lower part of the tray, the apparatus can be downsized and correspond to both the vertical and horizontal placing of a disk.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A disk apparatus comprising a tray for mounting a hole-formed cartridge that houses a disk having an information layer, a motor for rotating the disk, and a base having a first projection and the motor mounted thereon;

the tray has a second projection for engaging in the hole of the cartridge and a hole for engaging with the first projection of the base;

wherein, at a loading position for loading the disk on the motor, the first projection of the base engages in the hole of the tray so that the tray is positioned on the base; and when the cartridge is mounted on the tray, the second projection of the tray engages in the hole of the cartridge so that the cartridge is positioned on the tray.

* * * * *